(12) United States Patent  (10) Patent No.: US 6,386,757 B1
Konno  (45) Date of Patent: May 14, 2002

(54) EAR TYPE CLINICAL THERMOMETER

(75) Inventor: Tomoyasu Konno, Fuji (JP)

(73) Assignee: Terumo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,033

(22) Filed: Jan. 13, 2000

Related U.S. Application Data

(63) Continuation of application No. PCT/JP98/03128, filed on Jul. 13, 1998.

(30) Foreign Application Priority Data

| Jul. 16, 1997 | (JP) | 9-207088 |
| Jul. 16, 1997 | (JP) | 9-207089 |
| Jul. 16, 1997 | (JP) | 9-207090 |
| Oct. 20, 1997 | (JP) | 9-306655 |
| Oct. 21, 1997 | (JP) | 9-307962 |

(51) Int. Cl.⁷ .................. G01K 1/08
(52) U.S. Cl. ............ 374/158; 374/209
(58) Field of Search ............. 374/158, 204; 600/549, 474

(56) References Cited

U.S. PATENT DOCUMENTS

| 3,663,917 A | * | 5/1972 | Mahmoodi ............ 374/158 |
| 4,072,054 A | * | 2/1978 | Blouin et al. ............ 374/158 |
| 4,168,626 A | | 9/1979 | Fullager |
| 5,088,834 A | | 2/1992 | Howe et al. |
| 5,179,936 A | * | 1/1993 | O'Hara et al. ............ 374/158 |
| 5,293,877 A | | 3/1994 | O'Hara et al. |
| 5,381,796 A | | 1/1995 | Pompei |
| 5,609,564 A | * | 3/1997 | Makita et al. ............ 600/200 |
| 5,645,350 A | | 7/1997 | Jang |
| 6,152,596 A | * | 11/2000 | Fraden ............ 374/158 |
| 6,224,256 B1 | * | 5/2001 | Bala ............ 374/158 |

FOREIGN PATENT DOCUMENTS

| JP | 61138130 A | * | 6/1986 | ............ 374/161 |
| JP | 2-35322 | | 2/1990 | |
| JP | 6-66639 | | 3/1994 | |
| JP | 7-83761 | | 3/1995 | |
| JP | 8-145800 | | 6/1996 | |
| JP | 09084767 | * | 3/1997 | |
| JP | 2000139848 A | * | 5/2000 | |
| SU | 601001 | * | 5/1978 | |

OTHER PUBLICATIONS

Brochure describing "TYMTHER", manufactured by Taiho Co., Ltd., 4 pages., No date.
Brochure describing "Genius", manufactured by Sherwood, Inc., 7 pages., No date.

* cited by examiner

Primary Examiner—Diego F. F. Gutierrez
Assistant Examiner—Lydia M. DeJesús
(74) Attorney, Agent, or Firm—Burns, Doane, Swecker & Mathis, LLP

(57) ABSTRACT

An ear type thermometer for metering a body temperature includes a thermometer body, and a probe mounted in the thermometer body and adapted to be inserted into an ear. The probe is provided with a probe cover. A screwing member is provide for fixing the probe cover on the probe.

14 Claims, 21 Drawing Sheets

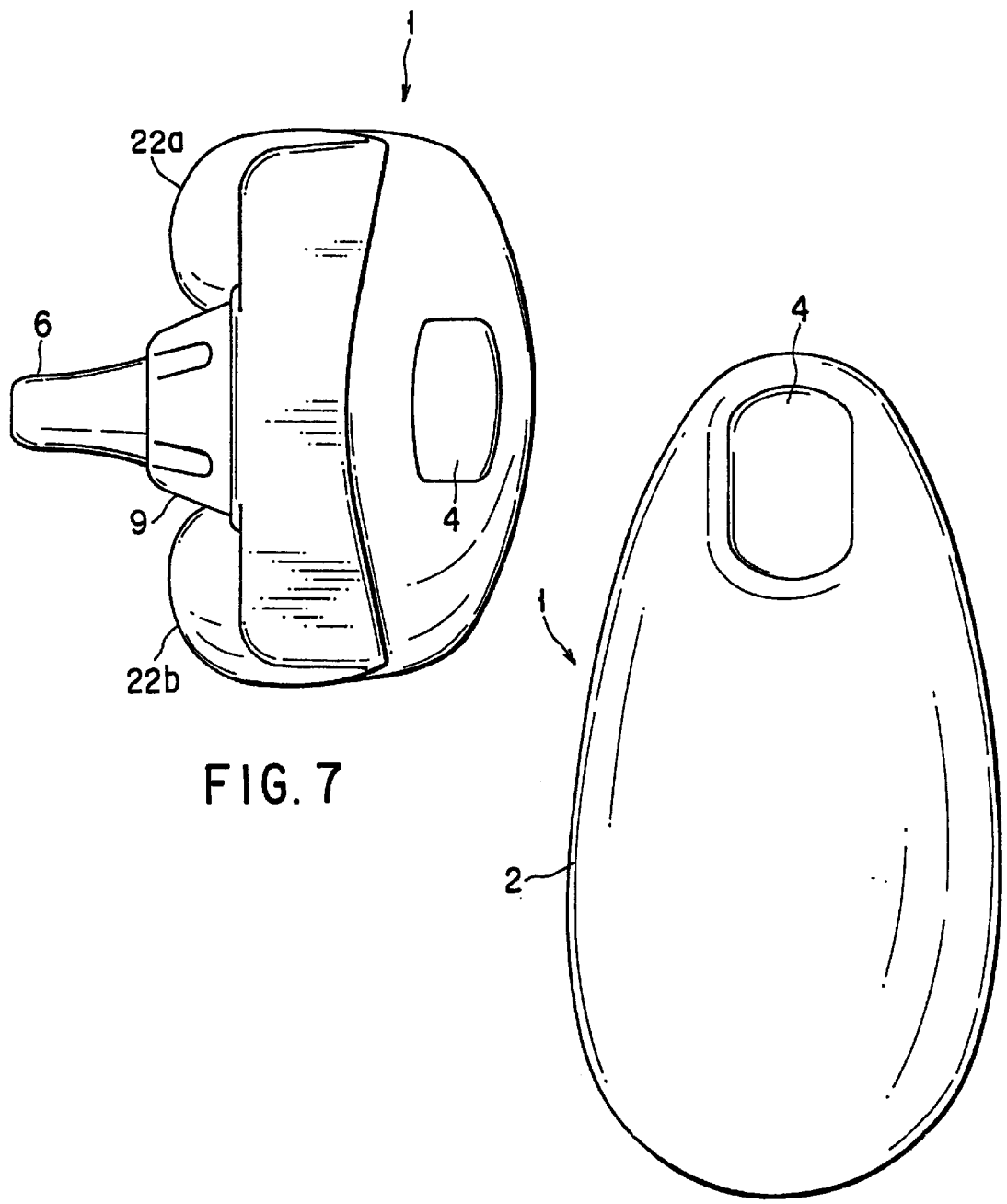

EAR TYPE CLINICAL THERMOMETER

CROSS REFERENCE TO RELATED APPLICATIONS

This is a continuation of Application No. PCT/JP98/03128, filed Jul. 13, 1998.

BACKGROUND OF THE INVENTION

The present invention relates to an ear type clinical thermometer (or infrared clinical thermometer: hereafter referred to as an ear type thermometer) for metering a body temperature by detecting an infrared ray emitted from the inside of an ear.

In the prior art, as a clinical thermometer (hereafter referred to as a thermometer) for metering a body temperature in a medical institution such as a hospital or at home, there has been proposed the ear type thermometer for metering the body temperature in terms of the intensity of an infrared ray (heat ray) by inserting a probe (thermometric portion) into the earhole (external auditory miatus, ear cannal) and by detecting the infrared ray radiated from the eardrum (tympnic membrane) and its vicinity.

This ear type thermometer is highly advantageous in that the time period required for the thermometry is as short as about 1 to 2 secs., especially when the body temperature of an infant or child unable to wait for a long time.

In this ear type thermometer for metering the body temperatures of a plurality of patients, a probe cover, which is replaceable and disposable, is mounted to cover the probe, from the standpoints of health administrations for preventing the contagion.

As disclosed in U.S. Pat. No. 5,088,834, the probe cover is mounted on the probe such that the probe cover is fitted on the probe or such that a ring-shaped recess, as formed in the inner face of the probe cover, is fitted on a ring-shaped projection, as formed on the outer face of the probe, to keep their mounting state.

However, this mounting state by this simple fitting relation has a dispersion in its fitting strength and may be unable to keep the mounted state stably. In this case, there may arise a disadvantage that the probe cover is left in the earhole when the probe covered with the probe cover is removed after the thermometry.

Since the probe cover can be easily removed from the probe, moreover, there arises another disadvantage that the infant may erroneously remove the probe cover and take it into the mouth.

Moreover, the probe cover may go out of position from the probe, although it is not removed from the probe, to cause a drop in the thermometric accuracy.

Moreover, the probe having the probe cover mounted thereon is so tapered toward its distal end as to facilitate the insertion into the earhole (ear). As a result, the depth of insertion of the probe into the earhole depends upon the pushing force so that it is difficult to be constant. As a result, the reproducibility is deteriorated to cause a dispersion in the metered value of the body temperature thereby to drop the thermometric accuracy. In addition to this defect, the probe may be inserted excessively deeply into the earhole to hurt the deep portion of the ear.

Moreover, the thermometric conditions such as the direction and depth of insertion of the probe into the earhole (ear) may exert serious influences upon the metered value, and the deviation of the probe during the thermometry may cause a serious error in the metered value. Upon the thermometry, for example, the operation of the thermometric switch moves the hand holding the thermometer body, and the probe may deflect in the earhole. Moreover, the thermometer body cannot be stably held with respect to the face but may go out of position. In this case, the dispersion of the metered value may occur to deteriorate the reproducibility thereby to deteriorate the reliability of the ear type thermometer.

In this ear type thermometer, there is mounted a buzzer for informing of the finish of the thermometry of the body temperature.

This buzzer sound has to be set to such a large level as to inform the subject sufficiently. At the finish of the thermometry, however, the buzzer sound may be transmitted to the earhole of the subject through the probe or its periphery, because the probe is inserted in the earhole of the subject (such as the infant or child), thus raising a problem that the subject is discomforted.

If the volume of the buzzer sound is reduced to avoid this uncomfortableness of the subject, the buzzer sound becomes difficult to hear by the operator, and the finish of thermometry cannot be grasped according to the environment.

In this ear type thermometer, moreover, the time period required for metering the temperature actually is as short as about 1 to 2 secs., but an additional standby time is required for the thermometry from a thermometry to a next thermometry. Moreover, an indication is made in a display so as to inform the standby time and the end of the standby time. This indication is exemplified by letters "WAIT" to be flashed during the standby time or a mark to be flashed at the end of the standby time (as disclosed in Unexamined Published Japanese Patent Nos. 8-145800 and 2-35322).

However, this indication can inform merely the standby or its end but not the lapse of time easily.

Thus, it is unknown when the standby time ends or how long the time is left. This raises a problem that the subject is discomforted or hurt by the standby.

When the body temperature of a infant or child is to be metered, moreover, it may be unable to well-behaved for the standby time thereby to trouble the thermometry.

Moreover, the thermometric portion of this ear type thermometer is constructed to include an infrared sensor composed of thermopile having cold junctions and hot junctions, and a temperature sensor for detecting the temperature (=the environmental temperature) at the cold junctions of the thermopile, so that the body temperature is metered on the basis of the signals outputted from the infrared sensor and the temperature sensor.

In this case, it is ideal to equalize the thermal responsibilities of the individual cold junctions and the temperature sensor, but this equalization is practically impossible. This raises a problem that an error is caused in the metered body temperature to deteriorate the thermometric accuracy. Especially in transient situations where the environmental temperature (the temperature of the atmosphere in which the thermometer is placed) is fluctuating so that the temperature of the infrared sensor itself is changing, the temperature of the temperature sensor and the temperature of the cold junctions become different to make an error in the metered body temperature value.

Here, it is conceivable to correct the temperature considering the foregoing defects. However, the thermometry is easily influenced by the noises and difficult to stabilize.

It is, therefore, an object of the invention to provide an ear type thermometer which is highly usable and/or which can meter the body temperature highly accurately.

More specifically, an object of the invention is to provide an ear type thermometer which can stabilize the mounting of the probe cover on the probe while improving the accuracy of thermometry, which can meter the body temperature highly accurately without being influenced by the action or position at the thermometry, which can suppress the uncomfortableness of a subject without deteriorating the function to inform the information sound emitted from a sound source, which can easily know the lapse of time during a standby time, and/or which can improve the thermometric accuracy with being hardly influenced by the noises.

BRIEF SUMMARY OF THE INVENTION

According to the present invention, there is provided an ear type thermometer for metering a body temperature, comprising: a thermometer body; a probe mounted in the thermometer body and adapted to be inserted into an ear, with a probe cover, wherein the improvement comprises a screwing member for fixing the probe cover mounted on the probe.

According to the present invention, there is further provided an ear type thermometer for metering a body temperature, comprising: a thermometer body; a probe mounted in the thermometer body and adapted to be inserted into an ear, with a probe cover, wherein the improvement comprises at least one screwing member having a function to fix the probe cover mounted on the probe and having different shapes and sizes to be replaced for use.

According to the present invention, there is further provided an ear type thermometer for metering a body temperature, comprising: a thermometer body; a probe mounted in the thermometer body and adapted to be inserted into an ear, with a probe cover, wherein the improvement comprises at least one screwing member having a function to fix the probe cover mounted on the probe and having different lengths of protrusion of the probe to be replaced for use.

According to the present invention, there is further provided an ear type thermometer comprising: a probe mounted on a thermometer body and adapted to be inserted into an ear; and a thermometric switch mounted on the thermometer body and adapted to be operated at the time of at least the start or finish of thermometry, wherein the protrusion direction of the probe from the thermometer body and the operation direction of the thermometric switch are substantially aligned with each other.

According to the present invention, there is still further provided an ear type thermometer comprising a probe mounted on a thermometer body and adapted to be inserted into an ear, wherein the thermometer body includes at least one raised portion for abutting against the vicinity of the ear, into which the probe is to be inserted, to support the thermometer body.

According to the present invention, there is still further provided an ear type thermometer for metering a body temperature by detecting the intensity of an infrared ray emitted from the inside of an ear, comprising: a thermometer body having a sound source therein for emitting an information sound; a probe mounted on the thermometer body and adapted to be inserted into the ear; and a soundproof mechanism for suppressing the transmission of the information sound, as emitted from the sound source, into the ear.

According to the present invention, there is further provided an ear type thermometer for metering a body temperature by detecting the intensity of an infrared ray emitted from the inside of an ear, comprising a display composed of a plurality of segments for indicating a symbol mark in such a mode that the number of segments to be lighted or flashed changes with time.

According to the present invention, there is further provided an ear type thermometer for metering a body temperature by detecting the intensity of an infrared ray emitted from the inside of an ear, comprising a display composed of a plurality of segments for indicating a symbol mark in such a mode that the number of segments to be lighted or flashed increases with time until all the segments are lighted or flashed.

According to the present invention, there is still further provided an ear type thermometer comprising a thermometric portion for detecting the intensity of an infrared ray depending upon the temperature in an ear, so that the temperature value in the ear may be computed by correcting the detected value, as obtained from the detected signal detected by the thermometric portion, according to the change in the temperature of the environment in which the thermometric portion is placed, wherein the correction is substantially undone when the changing rate of the environmental temperature is low.

According to the present invention, there is still further provided an ear type thermometer comprising a thermometric portion for detecting the intensity of an infrared ray depending upon the temperature in an ear, so that the temperature value in the ear may be computed by correcting the detected value, as obtained from the detected signal detected by the thermometric portion, according to the change in the temperature of the environment in which the thermometric portion is placed, wherein the magnitude of the correction is given an upper limit and/or a lower limit.

Further features of the invention will be become apparent from the following description and are also described in the appended CLAIMS.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a top plan view showing a thermometer of the invention;

FIG. 8 is a rear view of the thermometer of the invention;

DETAILED DESCRIPTION OF THE INVENTION

A thermometer of the invention will be described in detail in connection with its embodiments with a reference to the accompanying drawings.

Figure 1:
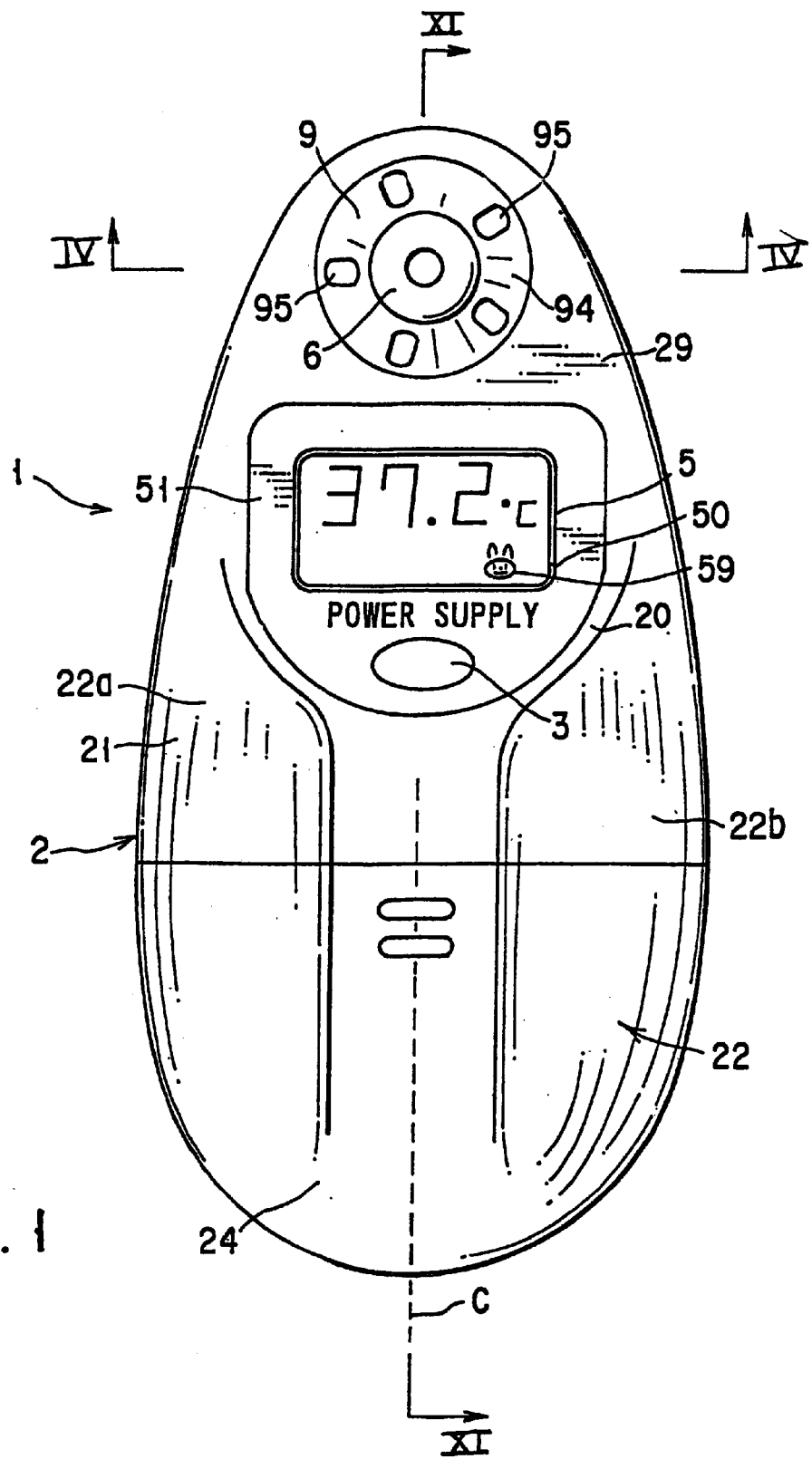
FIG. 1 is a front view showing a thermometer of the invention.
Figure 2:
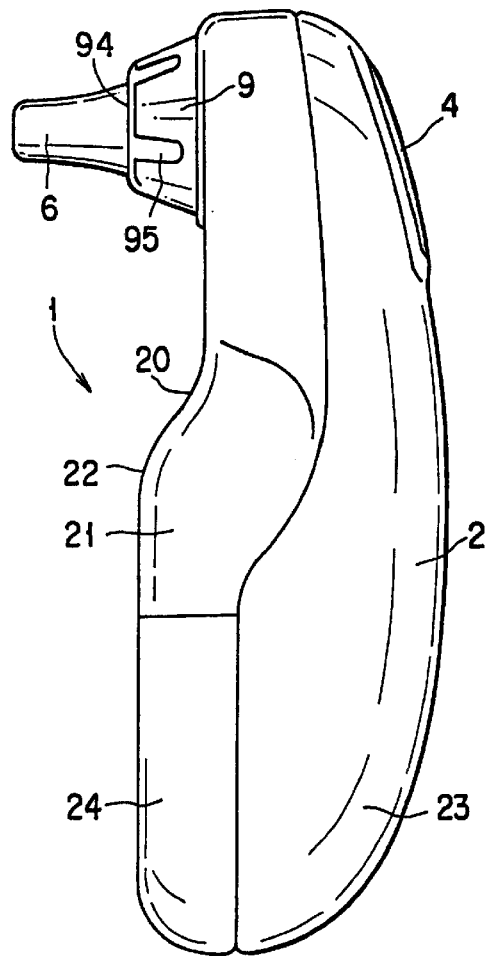
FIG. 2 is a side view showing a thermometer of the invention.
Figure 3:
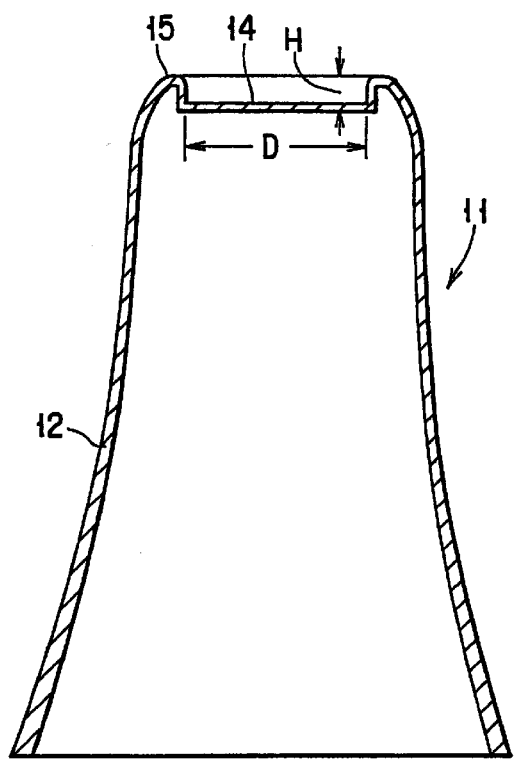
FIG. 3 is a longitudinal section showing an example of the construction of a probe cover to be used in the thermometer of the invention.
Figure 4:
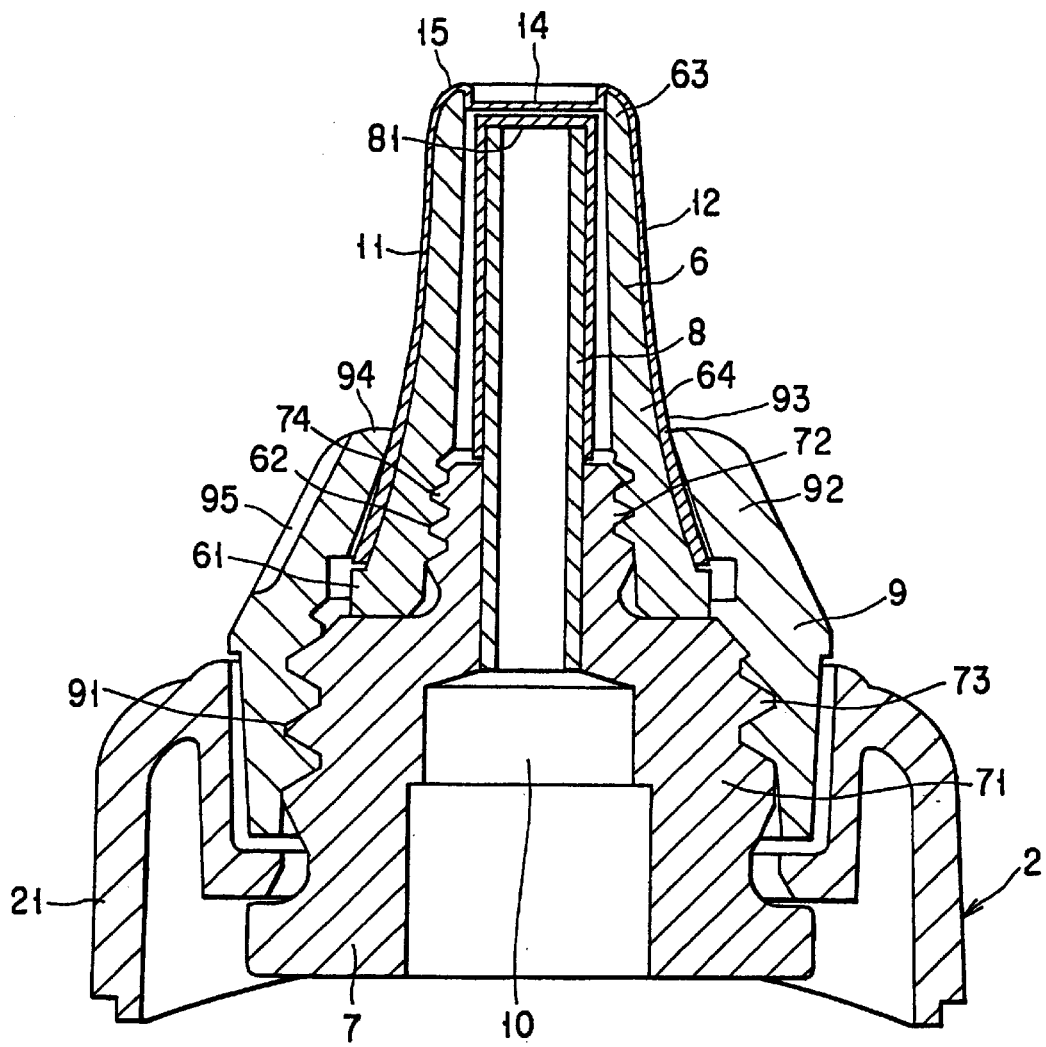
FIG. 4 is a section taken along line IV–IV of FIG. 1 and showing a state in which the probe cover is mounted.

FIGS. 1 and 2 are front and side views showing a thermometer of the invention, respectively; FIG. 3 is a longitudinal section showing an example of the construction of a probe cover to be mounted on the thermometer of the invention; and FIG. 4 is a section taken along line IV–IV of FIG. 1 and showing a state in which the probe cover is mounted on a probe in the thermometer of the invention. For conveniences of description: the upper sides of FIGS. 1 and 2 will be termed as the "upper portion", and the lower sides will be termed as the "lower portion"; and the upper sides of FIGS. 3 and 4 will be termed as the "distal end", and the lower sides will be termed as the "proximal end."

AS shown in FIGS. 1, 2 and 4, a thermometer 1 of the invention is of the ear type for detecting a body temperature by metering the intensity of an infrared ray issued from the eardrum (tympanic membrane) and its vicinity. The thermometer 1 is constructed to comprise: a thermometer body 2 having a casing 21; a power switch 3 and a display 5 mounted on the front face of the thermometer body 2; and a thermometric switch 4 mounted on the upper portion of the back face of the thermometer body 2.

A probe 6 is removably mounted on the front side of the upper portion of the thermometer body 2. As shown in FIG. 4, a support body 7 includes a radially larger portion 71 and a radially smaller portion 72, as located on the distal end side of the radially larger portion 71. External threads 73 and 74 are formed in the outer circumferences of the radially larger and smaller portions 71 and 72, respectively. The support base 7 is preferably constructed of a block made of a highly thermally conductive metal such as aluminum or copper or the like.

At the proximal end of the tubular probe 6, on the other hand, there is formed a priximal portion 61 which is in abutment against the distal end face of the radially larger portion 71. In the inner face of the proximal end side of the probe 6, there is formed an internal thread 62 which is in screwed engagement with the external thread 74. By this screwed engagement between the external thread 74 and the internal thread 62, the probe 6 is supported and fixed on the support base 7. On the other hand, this support base 7 is fixed on the (not-shown) circuit board, which is fixed in the casing 21.

Moreover, the probe 6 is so gradually radially reduced in its external diameter toward its distal end that its distal end outer circumference (edge) 63 is rounded considering safety when the probe 6 is inserted into the earhole.

Here, the material for the probe 6 can be exemplified by a resin material such as an ABS resin or a styrol resin. Moreover, an additive such as an antibacterial agent or reinforcing glass can also be contained in the material of the probe 6.

At the central portion of the support base 7, there is erected a light guide (waveguide) 8 for guiding the infrared ray (heat ray), as introduced from its distal end, to an infrared sensor (temperature detecting sensor) 10. The light guide 8 is preferably made of a highly thermally conductive metal such as copper or the like and plated on its inner face with gold.

Moreover, the light guide 8 is covered at its distal end opening with a protective sheet 81. This sheet 81 prevents dust or the like from invading the inside of the light guide 8. Here, the protective sheet 81 has a transmission to an infrared ray, and its material can be exemplified by a resin material similar to that of a later-described probe cover 11. The protective sheet 81 can be made as thick as about 0.03 to 0.08 mm.

Onto the radially larger portion 71 of the support base 7, there is screwed a ring nut (fixing member) 9. Specifically, the ring nut 9 is internally threaded at 91 in the inner face of its proximal end so that it is supported and fixed on the support base 7 by screwing the internal thread 91 on the external thread 73 of the radially larger portion 71.

This ring nut 9 is so tapered at 92 that its external diameter is gradually reduced in its external diameter from the vicinity of the distal end of the internal thread 91 toward its distal end. In the inner face of the tapered portion 92, there is formed an engaging portion 93 which is in engagement with the trunk portion 12 of the probe cover 11. Moreover, the material for the ring nut 9 can be exemplified by a resin material such as an ABS resin or a styrol resin. Moreover, an additive such as an antibacterial agent or reinforcing glass can also be contained in the material of the ring nut 9.

The probe 6 is covered with the probe cover 11, and the ring nut 9 is scrwed by turning in a predetermined direction. Then, the trunk portion 12 of the probe cover 11 is clamped between a sloped portion 64 of the probe 6 and the engaging portion 93 of the ring nut 9 so that the probe cover 11 is reliably fixed on the probe 6.

Around the open end (proximal end) of the probe cover 11 of this embodiment, there may be formed a base portion or the like having a flange, which may be clamped between the probe 6 and the ring nut 9 to fix the probe cover 11.

During the body thermometry, therefore, the probe cover 11 is not displaced with respect to the probe 6 so that a high thermometry can be kept. Moreover, the probe cover 11 will not easily come out from the probe 6. When the probe 6 is pulled out of the earhole after the thermometry, for example, it is possible to prevent without fail the disadvantage, as might otherwise be caused, that only the probe cover 11 is left in the earhole.

When the probe cover 11 is to be removed from the probe 6, on the other hand, the ring nut 9 has to be turned and released from the radially larger portion 71 by a considerable force. This can further prevent the disadvantage that an infant might otherwise erroneously remove the probe cover 11 and take it into the mouth.

A distal end face 94 of the ring nut 9 is formed into a generally flat face. When the probe 6 is inserted into the earhole, the distal end face 94 comes into abutment against the vicinity of the entrance of the earhole to regulate the insertion of the probe 6 to a predetermined depth. As a result, the thermometry can always be performed under proper conditions to prevent the metering error, as might otherwise be caused by the fluctuations in the depth of insertion into the earhole, and to eliminate the disadvantage that the probe 6 might otherwise go deeply into the earhole to hurt the deep portion of the ear.

In the outer circumference of the tapered portion 92 of the ring nut 9, on the other hand, there are formed a plurality of grooves (or slide stopping means) 95 which are arranged at a predetermined circumferential pitch to exhibit an effect to prevent the slide in a direction to turn and fasten or loosen the ring nut 9.

Here, the slide stopping means should not be limited to the recesses such as the grooves 95 but may be exemplified by ridges for similar functions or may have a highly frictional material such as rubber arranged.

The infrared sensor 10 is equipped with a thermopile for detecting the intensity of the infrared ray to meter the body temperature.

A proper example of the construction of the probe cover 11 to be mounted on the probe 6 will be described with reference to FIG. 3.

The probe cover 11 is shaped to have an opened proximal end and a closed distal end. This probe cover 11 is composed of the cylindrical trunk portion 12, a film 14 formed at the distal end portion of the trunk portion 12 and capable of transmitting an infrared ray, and a ring-shaped lip portion 15 formed at the outer circumferential portion of the film 14 and extending to the distal side from the film 14.

Moreover, the trunk portion 12, the film 14 and the lip portion 15 are preferred to be integrally formed of a resin material in relation to the later-described manufacture process. This resin material can be exemplified by polyolefin such as polyethylene, polypropylene or a copolymer of ethylene-vinyl acetate, polyester such as polyethylene terephthalate or polybutylene terephthalate, or styrol resin.

The trunk portion 12 is gradually reduced in its external and internal diameters toward its distal end. The thickness of the trunk portion 12 is also gradually reduced toward the distal end.

The thickness of the film 14 should not be especially limited but is preferably 0.01 to 0.10 mm, more preferably 0.05 to 0.07 mm. With an excessive thinness, the film 14 may become short of strength and liable to break depending upon its material. With an excessive thickness, on the other hand, the film 14 may have a lower transmission to the infrared ray and may obstruct a precise thermometry of the body temperature.

In this probe cover 11, with the presence of the lip portion 15, the film 14 can be lowered by a predetermined distance (H) from the distal end to the proximal end side of the probe cover 11. As a result, the film 14 can be kept out of contact with the inner face or its periphery of the earhole, when the probe 6 is inserted carrying the probe cover 11 into the earhole, or can be kept out of touch of the finger or the like when the probe cover 11 is mounted on or demounted from the probe 6, so that its surface can be kept clean to maintain a higher thermometric accuracy.

The lip portion 15 is shaped to be fitted in the distal end portion of the probe 6. Specifically, with the probe cover 11 being mounted on the probe 6, as shown in FIG. 4, the lip portion 15 is fitted in the distal end outer circumference 63 of the probe 6. As a result, when the probe 6 is inserted (for the thermometry) into the earhole, the distal end portion of the probe cover 11 can be prevented from going out of position with respect to the probe 6, and the film 14 is tensed by a predetermined force and prevented from any wrinkle or slackness so that the lip portion 15 contributes to an improvement in the thermometric accuracy.

Moreover, the lip portion 15 has a rounded distal end. As a result, when the probe 6 is inserted into the earhole, the lip portion 15 neither pains nor the inner wall of the earhole to retain a high safety.

If the height H of the lip portion 15 is excessively small, the aforementioned effect, as could otherwise be obtained by the lip portion 15, is not sufficiently exhibited. If the height H of the lip portion 15 is excessively large, the film 14 may become heterogeneous in its thickness depending upon the remaining conditions such as its material when the probe cover 11 is molded, thereby to cause a disadvantage that its thin portion may be wrinkled or broken.

It is, therefore, preferable, that the height H of the lip portion 15 should satisfy a relation of $4 \leq D/H \leq 55$, where letter D designates the diameter of the film 14.

The process for manufacturing (molding) the probe cover 11 may preferably be exemplified by the following one, although not especially limited thereto.

A resin sheet to be molded into the probe cover 11 is prepared and is heated from the lower portion of FIG. 3 by a heater so that it is sufficiently softened, and the heater is then taken out. After this, a sheet push member having a frusto-conical shape is brought into the resin sheet from the lower portion of FIG. 3, and a female mold having a shape contouring the outer shape of the probe cover 11 is brought into contact with the resin sheet from the upper portion of the resin sheet. The resin sheet is pushed midway of the female mold by the sheet push member and is evacuated by a vacuum pump through a thin hole which is formed in advance in such a portion of the female mold as to correspond to the lip portion. As a result, the softened resin sheet is pulled into the female mold to come into close contact with the inside of the female mold. In this state, the resin sheet is solidified, when cooled, so that it is molded to have the internal shape of the female mold. Next, this evacuation is stopped, and the female mold is moved upward to allow the resin sheet, as molded into the shape of the probe cover 11, to be taken out. After this, the probe cover 11 is manufactured by cutting (punching) out its proximal end side.

According to another method, a resin sheet to be molded into the probe cover 11 is prepared and is pushed upward from the lower portion of FIG. 3 and thermally deformed by a mold, which is shaped into the inner shape of the probe cover 11 and heated to a temperature to melt or soft the resin sheet. Simultaneously with this, a similar heated mold having a flat face contouring the film 14 is moved downward from the upper portion of FIG. 3 to clamp the portion of the film 14 between the two molds so that a desired film thickness is achieved by adjusting the clamping pressure. After this, the two molds are removed, and the resin sheet, as molded into the shape of the probe cover 11, is cooled and solidified. This probe cover 11 is manufactured by cutting (punching) out its proximal end side.

In the actual manufacture of the probe cover 11, it is preferable that the vertical directions should be inverted from those of FIG. 3, because the resin sheet will hang down by its own weight as it is heated.

Here, it goes without saying that the construction of the probe cover 11 should not be limited to that shown in FIG. 3.

Figure 5:
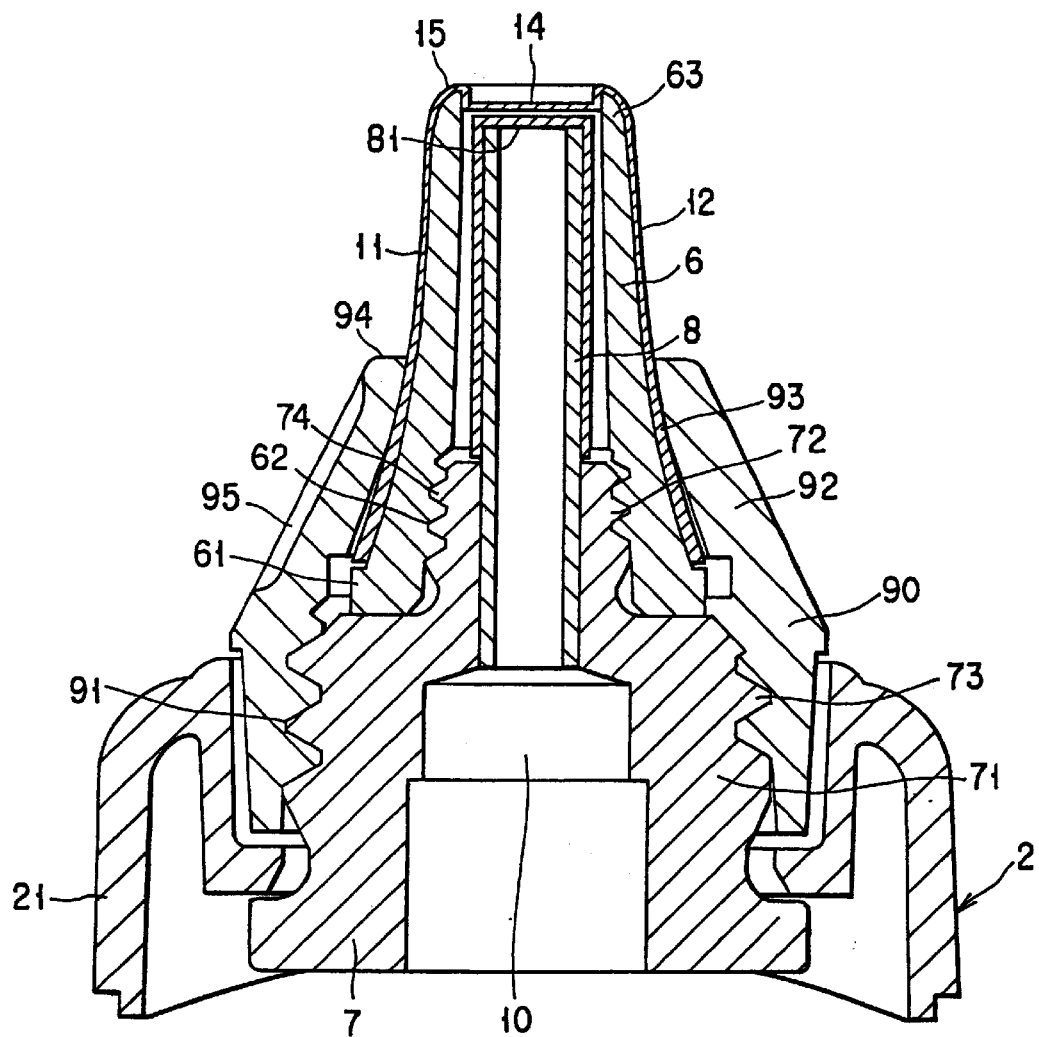
FIG. 5 is a longitudinal section showing a state in which a ring nut different from that shown in FIG. 4 is mounted.

On the other hand, the thermometer 1 of the invention can be used by replacing two or more ring nuts having different shapes and sizes. FIG. 5 is a longitudinal section showing a state in which a ring nut having a shape and a height different from those of the ring nut shown in FIG. 4 is mounted. Specifically, a ring nut 90 shown in FIG. 5 is given a larger height in the tapered portion 92 and a smaller external diameter at its distal end than those of the ring nut 9 shown in FIG. 4, but the remaining constructions and the function of the ring nut are similar. When this ring nut 90 is mounted, the probe 6 is given a shorter protrusion from the distal end face 94 than that of the construction of FIG. 4 so that its insertion into the earhole is shallower. Since the ring nuts having the different shapes and sizes can thus be replaced for use, the depth of insertion of the probe 6 into the earhole and the external diameter of the probe 6 can be set to the proper conditions according to ages or individual differences so that the thermometric accuracies can be improved in the individual cases.

Here, the replaceable ring nut may be exemplified by one having an equal height but a different shape of the distal end portion and a different area of the distal end face 94.

Figure 6:
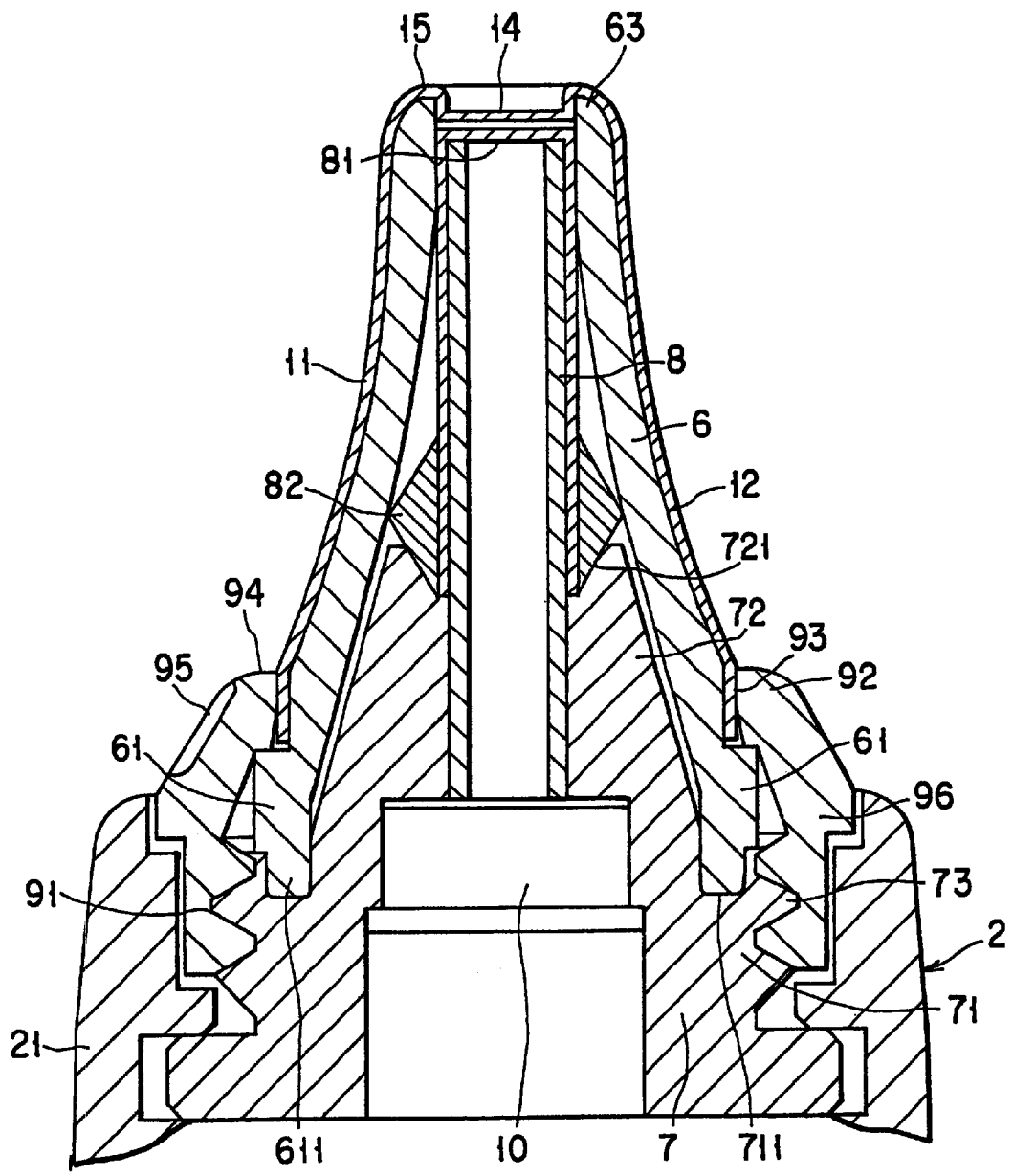
FIG. 6 is a longitudinal section showing the vicinity of a probe according to another embodiment of the thermometer of the invention.

FIG. 6 is a longitudinal section showing the vicinity of a probe of a thermometer according to another embodiment of the invention. The thermometer, as shown in FIG. 6, has a function for the ring nut to fix the probe and the probe cover simultaneously with respect to the thermometer body. The following description will be stressed on the differences from those of the embodiment shown in FIGS. 1 to 5.

The probe 6 is removably mounted on the front face side of the upper portion of the thermometer body 2.

The support base 7 is composed of the radially larger portion 71 having the external thread 73 in its outer circumference, and the radially smaller portion 72 at the distal end side of the larger portion 71. A ring-shaped groove 711 is formed in the distal end of the radially larger portion 71. On the other hand, the radially smaller portion 72 is so tapered that it can be inserted into the proximal end side of the probe 6.

At the proximal end of the probe 6, there is formed the proximal portion 61. The proximal end of this proximal portion 61 is shaped to be fitted in the groove 711. This shape is specified by a ring-shaped protrusion 611, for example.

Moreover, the probe 6 is gradually reduced in its external diameter toward its distal end, and its distal end outer circumferential portion 63 is so rounded as to ensure safety when it is inserted into the earhole.

At the center portion of the support base 7, there is erected the light guide (waveguide) 8 similar to the aforementioned one. This light guide 8 is so covered with the protective sheet 81 as to cover its distal end opening.

This protective sheet 81 is clamped and fixed in a tensed state by a ferrule (protective sheet fixing member) 82 which is fitted around the light guide and which has a generally diamond-shaped section. The ferrule 82 is fitted at its proximal end portion in a recess 721 which is formed in the distal end of the radially smaller portion 72.

On the radially larger portion 71 of the support base 7, there is screwed a ring nut 96 similar to the aforementioned one. In the inner face of the ring nut 96 on the proximal end side, specifically, there is formed the internal thread 91, which is screwed with the external thread 73 of the radially larger portion 71 to support and fix the ring nut 96 on the support base 7.

This ring nut 96 has the tapered portion 92 which is gradually reduced in its external diameter from the vicinity of the distal end of the internal thread 91 toward the distal end. In the inner face of the tapered portion 92, there is formed the engaging portion 93 which is in engagement with the probe cover 11.

With the probe 6 being covered with the probe cover 11, the protrusion 611 is fitted in the groove 711. Next, as the ring nut 96 is screwed by turning it in a predetermined direction, the probe cover 11 comes at the engaging portion 93 into engagement, and the proximal portion 61 is clamped between the radially larger portion 71 of the support base 7 and the engaging portion 93 of the ring nut 96 so that the probe 6 is reliably fixed with respect to the thermometer body 2. Thus, there are achieved effects similar to the aforementioned ones.

With the probe 6 and the probe cover 11 being fixed with respect to the thermometer body 2 by screwing the ring nut 96, the ferrule 82 comes at its outer circumferential portion into abutment against the inner face of the probe 6 so that it receives stresses in the axial direction of the light guide 8 and toward the proximal end. As a result, the protective sheet 81 is pulled toward the proximal end so that at least its portion covering the distal end opening of the light guide 8 is tensed to have no wrinkle.

The distal end face 94 of the ring nut 96 is formed into a generally flat face and is given a function to regulate the insertion of the probe 6 into the earhole to a predetermined depth, like before.

In the outer circumference of the tapered portion 92 of the ring nut 96, on the other hand, there are formed a plurality of grooves (slide stopping means) 95 which are arranged at a predetermined circumferential pitch, like before.

Here, the flanged mounting base portion or the like can be formed around the open end (proximal end) of the probe cover 11 of this embodiment so that the probe cover 11 can be fixed by clamping the flange or the like between the probe 6 and the ring nut 96.

Moreover, the wide area of the trunk portion 12 of the probe cover 11 of the ring nut 96 can be clamped by holding the probe cover 11 and the engaging portion 93 into a facial contact.

In this embodiment, too, two or more ring nuts having different shapes and sizes can be replaced for use.

The thermometer thus constructed has the advantage that it can be easily operated, because the probe 6 and the probe cover 11 can be simultaneously mounted on and demounted from the thermometer body 2.

Another advantage is that the thermometer can be easily cleaned with the probe 6 being removed, because no thread need be formed in the inner face of the probe 6.

Although the thermometer of the invention has been described in connection with its embodiments with reference to the accompanying drawings, it should not be limited thereto. For example, the fixing member should not be limited to the ring nut to be screwed but may be any if it has a function at least to fix the probe cover.

Moreover, the probe cover 11 may have no lip portion or may be constructed by jointing a plurality of members.

FIGS. 7 and 8 are a top plan view and a rear view, respectively, and show the thermometer of the invention. For conveniences of description, the lefthand side of FIG. 7 is located at the "distal end" whereas the righthand side is at the "proximal end." The upper side of FIG. 8 is located at the "upper portion" whereas the lower side is at the "lower portion." The ring nut 9 is one raised portion of the thermometer body 2. On the thermometer body 2, as shown in FIGS. 1 and 2, there is formed another raised portion 22 which comes into abutment against the vicinity of the ear when the probe 6 is inserted for the thermometry. As a result, the raised portion 22 provides a fulcrum to fix the thermometer 1 at a predetermined portion of the face when the thermometer is used. In other words, the angle, depth and so on of the probe 6, as inserted into the earhole, can be easily kept as they are during the thermometry.

Moreover, the raised portion 22 is composed of at least a pair of raised portions 22a and 22b, as shown in FIGS. 1, 2 and 7. These raised portions 22a and 22b are raised in substantially the same direction as the protruding direction of the probe 6 from the same face as that, in which the probe 6 of the thermometer body 2 is placed, that is, from the front face. Moreover, the raised portions 22a and 22b are formed on the two sides of a center line C extending in the longitudinal direction.

Here, the rise in substantially the same direction of the protruding direction of the probe 6 means that the center line of the protruding direction of the probe 6 and the extensions of the raised portions in the height direction are generally in parallel.

Figure 10:
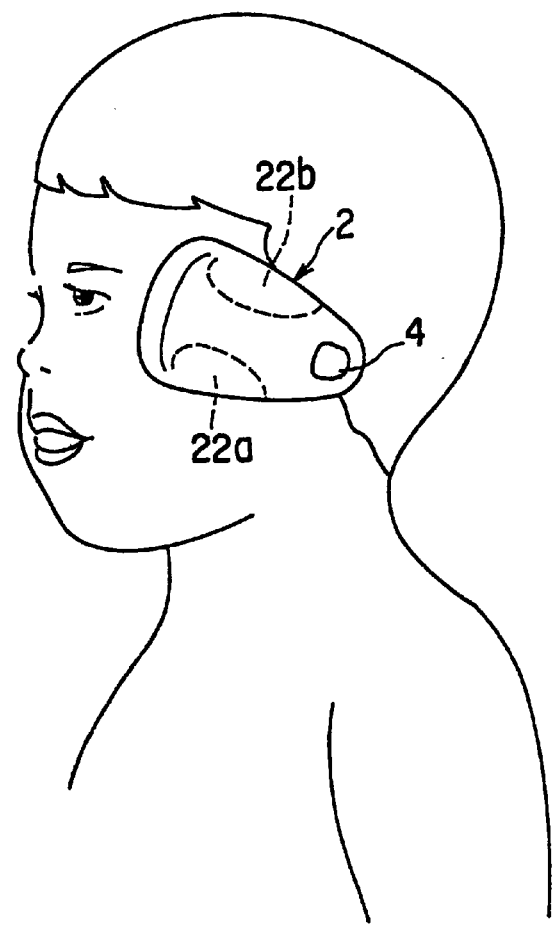
FIG. 10 is a perspective view showing a using example of the thermometer of the invention.

As shown in FIG. 10, moreover, the thermometer 1 is preferably used to abut against the positions across the cheekbone so that the raised portions 22a and 22b may individually come into abutment against the vicinities of the cheekbone. This positioning can make it easier and more reliable to fix the thermometer 1. For this positioning, the raised portions 22a and 22b are preferably arranged at a predetermined distance across a recess 20.

The probe 6 is formed on one longitudinal end side of the thermometer body 2, and the raised portions 22a and 22b are formed on the other end side. More specifically, the raised portions 22a and 22b are arranged at such a distance from the probe 6 as is suitable for supporting/fixing the thermometer body 2 on the face. With this construction, too, the thermometer 1 can be reliably fixed on the thermometer 1 around the raised portion 22.

The height, shape and so on of the raised portions 22a and 22b should not be especially limited, but may be have any height and shape if they can hold/fix the thermometer 1 with neither hurting the face nor discomforting the wearer. Here, the raised portions 22a and 22b need not have the same height and shape of rise but may have different heights and shapes.

The raised portions 22a and 22b are made of a resin material, for example, and may be formed integrally with or separately from the thermometer body 2. On the crest of the raised portion 22, on the other hand, there may be mounted a cushioning member which is made of rubber or a soft resin for damping the stimulation upon the face or preventing the slide.

In the recess 20 formed near the raised portions 22a and 22b, there is mounted the power switch 3 for turning ON/OFF the power of the thermometer. With this construction, it is possible to prevent the malfunction which might otherwise be caused the power supply is interrupted even during the thermometry by the touch of the power switch with a portion of the finger gripping the thermometer 1 or a portion of the face.

The power switch 3 may have any shape or any operation if it is positioned in the recess 20, but is preferably positioned in the recess 20 on the center line C of the thermometer body 2. As a result, the portion of the finger or face can be made more reluctant to touch the power switch 3 during the thermometry so that the aforementioned malfunction can be reliably prevented.

Moreover, the recess 20 is equipped with the display 5. Since the display 5 is disposed in the vicinity of the power switch 3, the connected state of the power switch 3 and the acting state of the thermometer 1 can be visually confirmed with ease from the indications of the display 5 simultaneously with the operation of the power switch 3.

The display 5 is constructed of a liquid crystal display device, for example, to display the metered value, the standby or elapsed time during the thermometry, and a letter, symbol or symbol mark for recognizing the residual of the battery.

Figure 9:
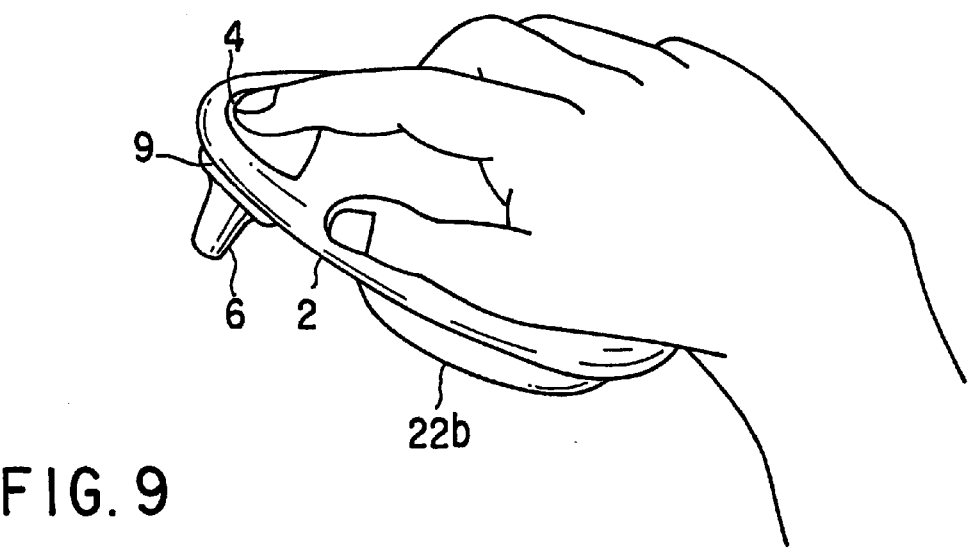
FIG. 9 is a perspective view showing a using example of the thermometer of the invention.

The thermometer body 2 is equipped on its back face side, as shown in FIGS. 8 and 9, with the thermometric switch 4 to be operated at least at the start or end of the thermometry. The direction to operate (press) the thermometric switch 4 and the direction to protrude the probe 6 are generally on a common axis. Here, this general alignment between the operating direction of the thermometric switch 4 and the protruding direction of the probe 6 means that the center line of the protruding direction of the probe 6 and the extension of the operating direction of the thermometric switch 4 are generally on a common line, and means that the later-described effect is not seriously reduced. With this construction, even if the thermometric switch 4 is operated by the hand gripping the thermometer body 2 while the probe 6 being inserted in the earhole, the probe 6 is neither moved in a direction different from its inserted direction nor turned in the earhole so that the angle, position and so on of insertion into the earhole are kept unchanged. As a result, the same thermometric position can always be maintained to prevent the fluctuation in the metered value. For a similar reasoning, moreover, it is preferred that the operating direction of the thermometric switch 4 and the protruding directions of the raised portions 22a and 22b be substantially identical.

The operations of this thermometric switch should not be especially limited but may be exemplified by the push, slide and touch types. However, the preferable one is the push type in which the thermometric switch 4 is pressed (pushed) in substantially the same direction as the protruding direction of the probe 6, and the more preferable one is the push type in which the pressing (pushing) action is followed by a click feel. This type is simple in operations but is not required for handling the thermometer body 2 for each operation of the thermometric switch 4 so that the angle, position and so on of insertion of the probe 6 into the earhole are not fluctuated to achieve the stable thermometry. Moreover, the push type followed by the click feel can confirm the operation of the thermometric switch 4 reliably by the sound and the touch feel.

On the other hand, the thermometric switch 4 is preferably exemplified by one for detecting the body temperature by operating it continuously till the finish of the thermometry and is especially preferably exemplified by one for the thermometry by pressing it at the start of the thermometry and continuing the press till the finish of the thermometry. This operation can prevent the fluctuation of the thermometer 1 during the thermometry more effectively.

This operation of the thermometric switch 4 may be effected by clicking it a plurality of times till the finish of the thermometry. Moreover, no especial restriction is on the arrangement position, the shape and size of the operation face, and the number of thermometric switches 4.

Although the thermometer of the invention has been described in connection with its embodiment with reference to the accompanying drawings, the invention should not be limited thereto.

For example, the thermometer body 2 should not be limited to the shown shape but may be any if at least the probe 6 and the thermometric switch 4 can be mounted thereon and easily operated by the single hand. On the other hand, the shape and number of the raised portion 22 can be arbitrary, and the raised portions 22a and 22b may merge at their end portions into each other to form one raised portion 22.

Figure 11:
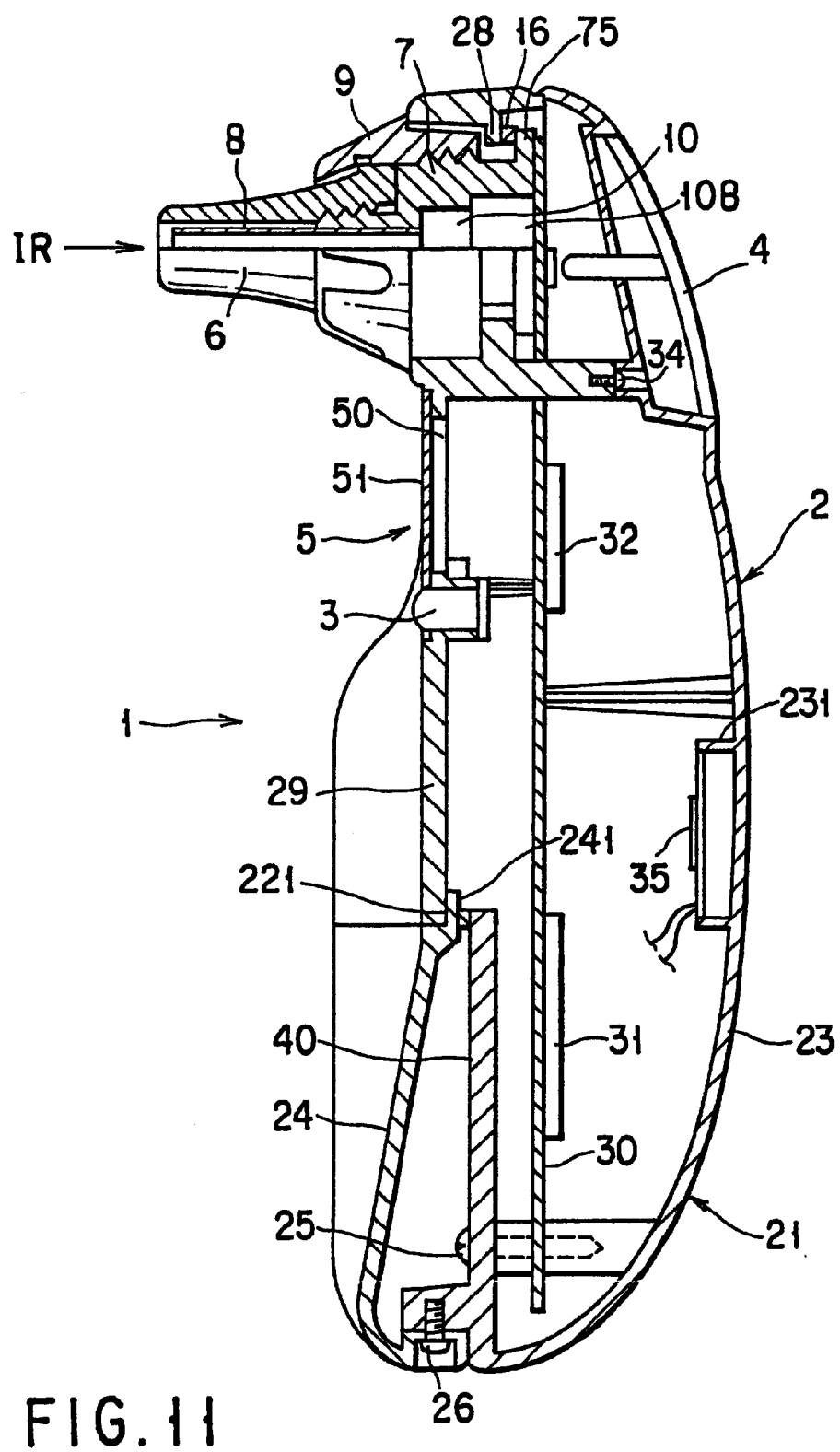
FIG. 11 is a section taken along line XI–XI of FIG. 1.
Figure 12:
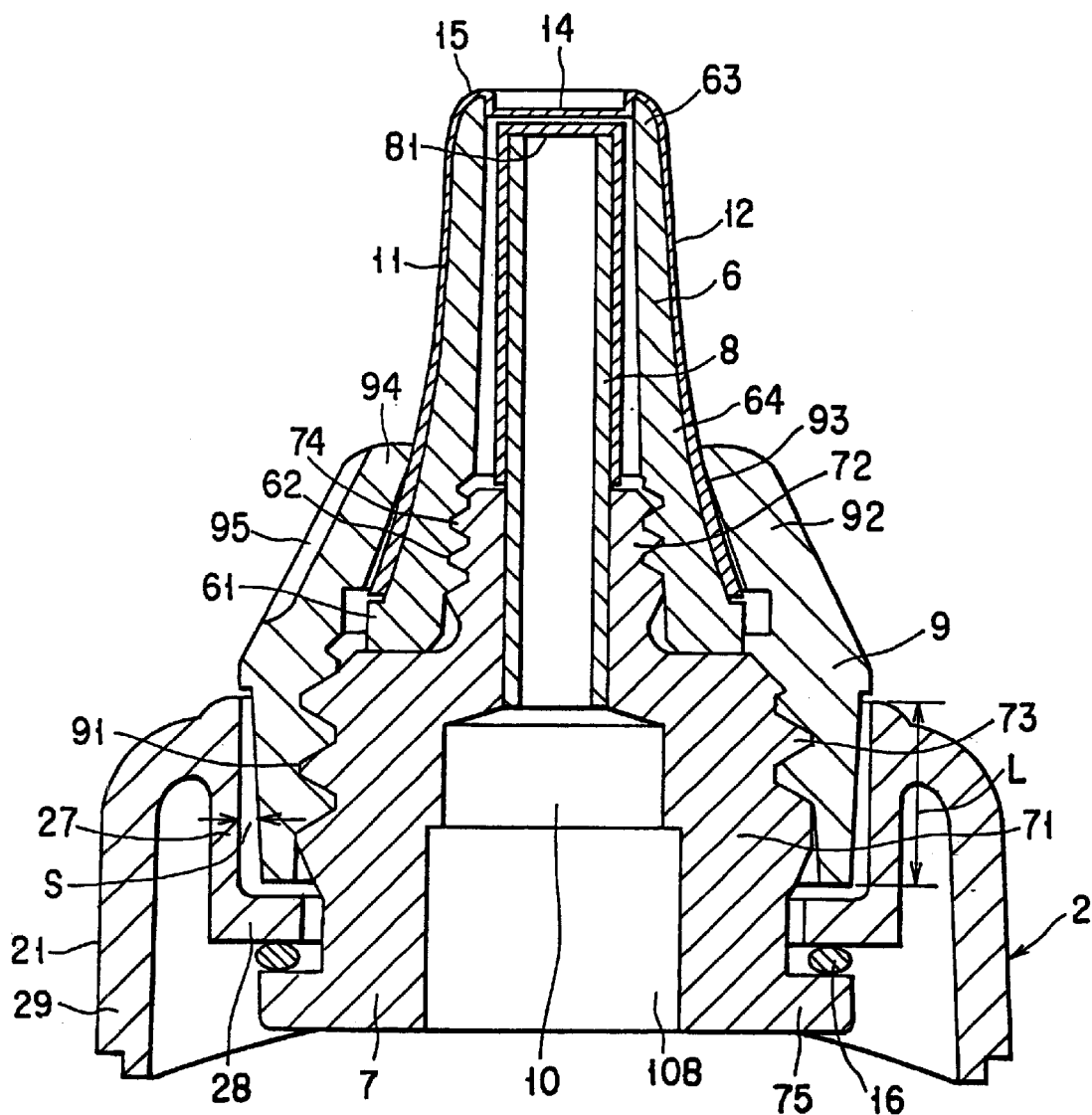
FIG. 12 is a section taken along line IV–IV of FIG. 1 and showing a state in which the probe cover is mounted on the probe in the thermometer of the invention and in which an O-ring is clamped midway of a beep sound (an information sound) transmitting passage.
Figure 13:
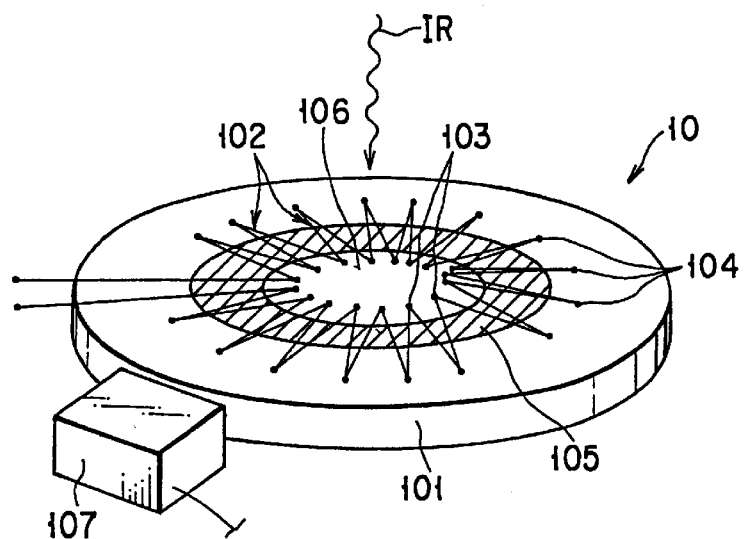
FIG. 13 is a perspective view showing an example of the construction of a temperature metering portion in the thermometer of the invention.
Figure 14:
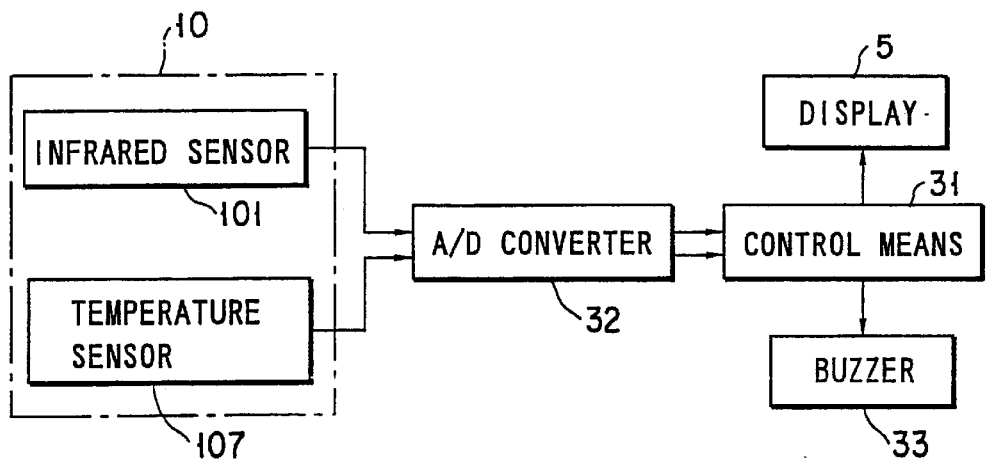
FIG. 14 is a block diagram showing a construction of the circuit of the thermometer of the invention.

FIG. 11 is a section taken along line IX–IX of FIG. 1; FIG. 12 is a section taken along line IV–IV of FIG. 1 and showing a state in which the probe cover is mounted on the probe of the thermometer of the invention having an O-ring clamped midway of a beep sound (an information sound) transmitting passage; and FIG. 13 is a perspective view showing a structure of a temperature metering portion; and FIG. 14 is a block diagram showing a circuit construction of the thermometer of the invention. For conveniences of description, the upper side of FIG. 11 will be called the "upper portion" whereas the lower side, the "lower portion." The lefthand side of FIG. 11 will be called the "front face" whereas the righthand side, the "back face." The upper side of FIG. 12 will be called the "distal end" whereas the lower side, the "proximal end." Moreover, the "front side portion of the casing" will mean the portion on the side of the probe (the side closer to the ear), as taken in the direction of the probe axis of the casing (the incidence direction of the infrared ray) whereas the "back side portion of the casing" will mean the portion on the side opposed to the probe (the side apart from the ear), as taken in the direction of the probe axis of the casing (the incidence direction of the infrared ray).

The casing 21 of the thermometer body 2 is constructed of three main components: a front casing 29 forming a front side portion of the casing; a back casing 23 forming a back side portion of the casing; and a cover member 24.

In the display 5 of the front face of the front casing 29, there is formed a body temperature indicating window (opening) 50. In this window 50, there is mounted a (not-shown) display unit made of a liquid crystal display element (LCD) for indicating the metered body temperature or other information (e.g., the residual of the battery or the standby time for the thermometry). Moreover, the window 50 is covered with a transparent sheet 51.

On the front face of the front casing 29, on the other hand, there is mounted the power switch 3 which has already been described.

The thermometric switch 4 is mounted on the upper portion of the back casing 23, which is fixed on the front casing 29 by means of screws 25, 34.

The cover member 24 is removably mounted on the lower portion of the front casing 29. Specifically, a retaining member 241, as formed at the upper end of the cover member 24, is retained on the retaining portion 221 of the front casing 29, and the lower end portion of the cover member 24 is fixed on the lower end portion of the front casing 29 by means of a screw (screw member) 26. This cover member 24 is opened/closed when the (not-shown) battery of a power supply 40 is loaded or replaced.

In the casing 21, as shown in FIG. 11, there is mounted a circuit board 30, on which there are mounted the thermometric portion 10, a thermometric portion support member 108, control means 31 made of a microcomputer, an A/D converter 32 and so on. In the casing 21, on the other hand, there is mounted the power supply 40 for housing the battery to supply the electric power to the portions of the circuit board 30. In the casing 21, there is further mounted a buzzer 33 for generating a beep sound (an information sound) when the thermometry is finished. In short, the thermometric mechanism is housed in the casing 21.

The thermometric portion 10 is constructed of an infrared sensor 101 and a temperature sensor (environmental temperature metering means) 107.

The control means 31 includes a CPU, a timer (including an auto power OFF timer) and a memory (RAM and ROM). This control means 31 makes the later-described control to activate the buzzer 33 when the thermometry is finished.

Moreover, the control means 31 is equipped with the auto power OFF timer for suppressing the useless power consumption.

This auto power OFF timer turns OFF the power automatically, if the power switch 3 is left ON, after a predetermined time period (60 secs.) after it was started. Even if the power switch is turned OFF within 60 secs. after the auto power OFF timer was started, the timer continues its counting action (time measuring action) till 60 secs. elapses.

As shown in FIG. 13, the infrared sensor 101 is equipped with a thermopile 102. Moreover, the thermopile has hot junctions 103 disposed at a heat collecting portion 106 positioned at the center through a thermally insulating band 105, and cold junctions 104 disposed around the thermally insulating band 105.

In the vicinity of the infrared sensor 101, on the other hand, there is disposed the temperature sensor 107. This temperature sensor 107 detects the temperature around the thermally insulating band 105 of the infrared sensor 101, i.e., the temperature of the environment where the infrared sensor 101 is placed, and the temperature of the cold junctions 104 which is in a state of a temperature equal to the environmental temperature, when the environmental temperature is not fluctuated (stable).

In this thermometric portion 10, the infrared sensor 101 and the temperature sensor 107 produce a signal corresponding to a temperature difference between the hot junctions 103, as heated by the irradiation of the infrared ray from the inside of the ear (the eardrum, the external auditory miatus), and the cold junctions 104, as left unheated by the infrared ray from the inside of the ear, and a signal corresponding to the temperature (environmental temperature) in the vicinity of the cold junctions 104, respectively, so that the body temperature can be determined by the functions of those signals.

Here, this thermometer 1 has a soundproof mechanism for exhibiting a function (as will be called the "soundproof function") to suppress the transmission of the beep sound, as emitted from the buzzer (sound source) 33, to the probe 6 or the probe side (the front face side of the thermometer 1). The thermometer 1 of this embodiment is equipped with a plurality of soundproof mechanisms, the constructions of which will be sequentially described in the following.

The vicinity of the support member 7 for the probe 6 constructs one transmission passage for the beep sound issued from the buzzer 33. By making this beep sound transmission passage long or complex, therefore, the soundproof function is exhibited. In this embodiment, the proximal end side of the ring nut 9 is inserted into the casing 21 (or the front casing 29) and is surrounded over its circumference by a wall portion 27. From the proximal end of the wall portion 27, there is protruded inward a rib 28. This rib 28 leaves a clearance from the support member 7. The wall portion 27 and the rib 28 are formed integrally with the front casing 29. With this construction, the clearance between the proximal end portion of the ring nut 9, the wall portion 27 and the rib 28, as providing the beep sound transmission passage, is elongated, narrowed and complicated to exhibit an excellent soundproof function.

In short, the support member 7 of the probe 6 and the ring nut 9 (as will be called the "probe supporting peripheral members") form the passage of the clearance having the narrow, long and complex shape with the casing, thereby to suppress the transmission of the beep sound through this portion. These clearances per se have an effect to suppress the transmission, as might otherwise be caused by the vibrations, of the beep sound from the casing 21 to the probe supporting peripheral members when contacted.

The clearance spacing S between the inner face of the wall portion 27 and the outer face of the ring nut 9 is preferred to be as small as possible. If $S \leq 0.1$ mm, however, the wall portion 27 (the casing 21) becomes liable to contact with the ring nut 9 thereby to cause the effect to transmit the beep sound by the vibrations. Specifically, the spacing S is preferably about 0.1 to 2.0 mm, and more preferably about 0.2 to 1.5 mm.

Moreover, the length L, as taken in the axial direction of the probe, of the clearance between the inner face of the wall portion 27 and the outer face of the ring nut 9 is preferred to be as large as possible. However, a preferable upper limit is determined from other practical points (such as the limit to the shape or the like), and the length L is preferably about 2.0 to 25.0 mm, and more preferably about 3.0 to 10.0 mm.

As the soundproof mechanism, on the other hand, there is disposed a vibration absorbing member 16 midway of the beep sound transmission passage. Specifically, the vibration absorbing member 16 made of an o-ring is clamped between the rib 28 made integral with the front casing 29 and a flange 75 of the support base 7. As a result, the beep sound transmission passage is partially blocked or constricted to exhibit an excellent soundproof function.

The diameter of the cross-section of the o-ring wire is 0.2 to 1.5 mm, and more preferably 0.5 to 1.2 mm. If the diameter is less than 0.2 mm, even a slight force to be applied to this portion becomes liable to cause the contact between the rib 28 and the flange 75 of the support base 7 thereby to effect the transmission of the beep sound by the vibrations. On the other hand, the value of 1.5 mm is an upper limit from the practical point (such as the limit to the shape or the like).

As the material for making the vibration absorbing member 16, there can be enumerated: a variety of rubber materials such as natural rubber, isoprene rubber, butadiene rubber, styrene-butadiene rubber, nytril rubber, chloroprene rubber, butyl rubber, acryl rubber, ethylene-propylene rubber, urethane rubber, silicone rubber or fluorine-contained rubber; or a variety of thermoplastic elastomers such as styrene, polyolefin, polyvinyl chloride, polyurethane, polyester or polyamide elastomer.

Moreover, the soundproof mechanism is characterized in that the buzzer 33 is mounted on the back face side (i.e., on the side opposed to the probe 6, as taken in the axial direction of the probe) of the thermometer body 2. As shown in FIG. 11, more specifically, the buzzer 33 is supported and fixed on the inner face on the back face side of the back casing 23 through a support portion 231. With this construction, the transmission of the sound, as emitted from the buzzer 33, can be reduced to provide the excellent soundproof function, in contrast that the sound is transmitted to the probe 6 through the circuit board 30 and the support base 7 when the buzzer 33 is mounted on the circuit board 30.

In this construction, the buzzer 33 is mounted on the inner face of the back face of the back casing 23 so that the beep sound issued from the buzzer 33 becomes liable to be released to the back face side of the thermometer body 2. Especially when the buzzer is mounted on the board 30, the resonance becomes reluctant to occur on the curved surface of the casing 21 so that the beep sound has a tendency to be transmitted from that portion. The buzzer is thus mounted on the inner face of the back face side of the back casing 23 so that the beep sound can be easily released to the back face irrespective of the shape of the surface from the back casing 23 which is equipped with the curved surface as in this embodiment. This makes it easier for the operator (for the thermometry) to hear the sound of the buzzer 33. As a result, the power consumption of the buzzer can be reduced, while keeping the easy hearing of the buzzer sound by the operator as in the prior art, and the level of the sound, as issued from the buzzer 33, can be relatively lowered to improve the soundproof function.

Here, the position for mounting the buzzer 33 should not be limited to the shown one but may be located on the inner side of the lower end portion of the back casing 23, for example.

On the other hand, the soundproof mechanism is characterized in that the thickness of the transparent sheet 51 covering the window 50 is made larger than that necessary for the strength (retaining strength). Specifically, the transparent sheet 51 is sufficient, if its thickness is about 0.2 mm, for the strength. In this embodiment, however, the thickness of the transparent sheet 51 is preferably 0.4 mm or more, and more preferably 0.5 mm or more. As a result, an excellent soundproof function is exhibited.

The area of the transparent sheet 51 should not be especially limited but is required to have a portion for adhering itself. The larger area is the better for preventing the separation, but the area has a preferably upper limit from the other practical point (such as the limit to the shape or the like). The ratio of the transparent sheet 51 to the opening area of the window 50 is preferably about 120 to 500%, and more preferably about 150 to 400%.

As the material for making the transparent sheet 51, here can be enumerated: a polyolefin such as polyethylene or polypropylene; an acrylic resin such as polyvinyl chloride, polycarbonate or polymethyl methacrylate; polyester such as polyethylene terephthalate or polybutylene terephthalate; or an ABS resin.

The individual soundproof mechanisms thus far described do not obstruct the release of the beep sound to the back face side (i.e., on the side opposed to the probe 6, as taken in the axial direction of the probe) of the thermometer body 2. Especially by exhibiting the soundproof function to the side (the front side) of the probe 6, the release of the buzzer sound (the beep sound) to the back face side can be improved to improve the audibility of the buzzer sound by the operator.

Moreover, the individual soundproof mechanisms can lower the transmission (propagation) of the beep sound into the ear having received the probe 6 preferably by 2 dB or more and more preferably by 3 dB or more. This can lighten and eliminate the uncomfortableness of the subject effectively.

Here will be described a method for using the thermometer 1.

The probe 6 is screwed and mounted on the radially smaller portion 72 of the support base 7 of the thermometer body 2, as has been described hereinbefore, and is covered with the probe cover 11. Next, the ring nut 9 is threaded on the probe cover 11 and is screwed on the radially larger portion 71 of the support base 7. As a result, the trunk portion 12 of the probe cover 11 is clamped between the sloped portion 64 of the probe 6 and the engaging portion 93 of the ring nut 9 so that the probe cover 11 is fixed on the probe 6. As a result, the mounting of the probe cover 11 is completed.

Next, the operator turns ON the power switch 3. After lapse of a predetermined time period, the operator grips the thermometer body 2 and inserts the probe 6, as enveloped by the probe cover 11, into the earhole of the subject.

Next, the thermometric switch 4 is pressed for a predetermined time period. As a result, the body temperature is metered. Specifically, the infrared ray (heat ray), as radiated from the eardrum membrane and its vicinity, transmits the film 14 and the protective sheet 81 sequentially and is guided into the light guide 8. The infrared ray is repeatedly reflected on the inner face of the light guide 8 and reaches the infrared sensor 101 of the thermometric portion 10 so that it irradiates the heat collecting portion 106.

From the infrared sensor 101, there is obtained an output (an analog signal) corresponding to the temperature difference between the hot junctions 103 and the cold junctions 104. This output is converted into a digital signal by the A/D converter 32 and is inputted to the control means 32.

From the temperature sensor 107, on the other hand, there is obtained an output (an analog signal) corresponding to the temperature (the environmental temperature) of the cold junctions 104. This output is converted into a digital signal by the A/D converter 32 and is inputted to the control means 32.

On the basis of the digital signals inputted from the infrared sensor and the temperature sensor, the control means 31 performs a predetermined operational processing and a suitable temperature correcting processing to determine the temperature. The temperature determined is indicated in the display 5.

When the thermometry is thus finished, the control means 31 drives the buzzer 33 to make a sound of the finish. The operator is enabled to know the finish of the thermometry by hearing the buzzer sound issued from the buzzer 33.

Here in this embodiment, the information sound is exemplified by the buzzer sound but may be another such as a voice coming from a sound source such as a small-sized speaker.

EXAMPLES

Here will be described specific examples of the invention.

The ear type thermometers having the constructions, as equipped with the following soundproof mechanisms ① to ④, as shown in FIGS. 11 and 12, were manufactured.

① The wall portion 27 and the rib 28 were formed.

The spacing S of the clearance between the inner face of the wall portion 27 and the outer face of the ring nut 9: 0.6 mm (on average).

The axial length L of the clearance between the inner face of the wall portion 27 and the outer face of the ring nut 9: 8.0 mm.

② The vibration absorbing member (the O-ring) 16 was mounted.

The material for the O-ring: Silicone rubber.

The diameter of the cross section of the O-ring wire: 0.5 mm.

③ The buzzer 33 was mounted on the inner face on the back face side of the back casing 23.

④ The transparent sheets 51 were given thicknesses of 0.5 mm, 0.8 mm and 1.5 mm.

The area ratios of the transparent sheets 51 to the window 50 were set to about 200%.

The material for making the transparent sheets 51: polycarbonate.

Example 1

The soundproof mechanism ① was incorporated. The buzzer 33 was mounted on the circuit substrate 30. The transparent sheet 51 was given a thickness of 0.2 mm.

Example 2

The soundproof mechanism ② was incorporated. The buzzer 33 was mounted on the circuit substrate 30. The transparent sheet 51 was given a thickness of 0.2 mm.

Example 3

The soundproof mechanism ③ was incorporated. The transparent sheet 51 was given a thickness of 0.2 mm.

Example 4a

The soundproof mechanism ④ (the thickness of the transparent sheet 51: 0.5 mm) was incorporated. The buzzer 33 was mounted on the circuit substrate 30.

Example 4b

The soundproof mechanism ④ (the thickness of the transparent sheet 51: 0.8 mm) was incorporated. The buzzer 33 was mounted on the circuit substrate 30.

Example 4c

The soundproof mechanism ④ (the thickness of the transparent sheet 51: 1.5 mm) was incorporated. The buzzer 33 was mounted on the circuit substrate 30.

Example 5

The soundproof mechanisms ① and ② were incorporated. The buzzer 33 was mounted on the circuit substrate 30. The transparent sheet 51 was given a thickness of 0.2 mm.

Example 6

The soundproof mechanisms ①, ② and ③ were incorporated. The transparent sheet 51 was given a thickness of 0.2 mm.

Example 7

The soundproof mechanisms ①, ②, ③ and ④ (the thickness of the transparent sheet 51: 0.5 mm) were incorporated.

Control

Figure 16:
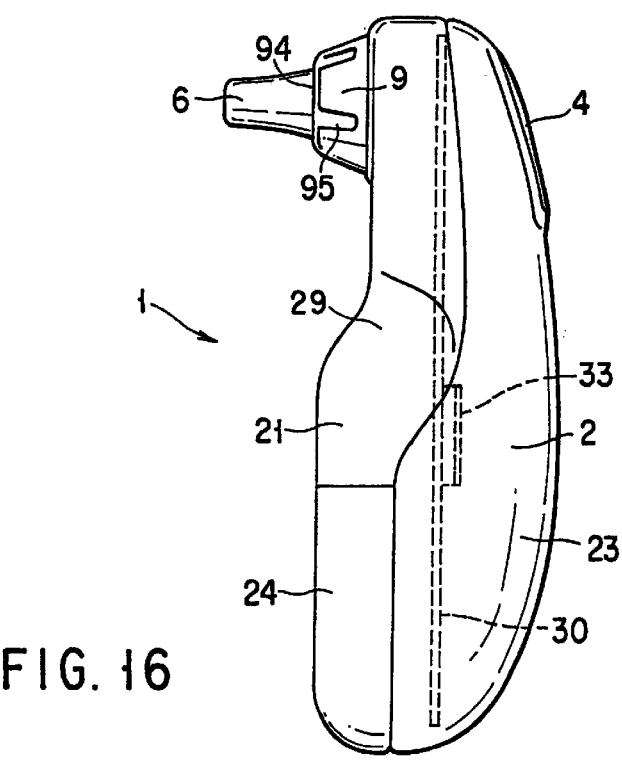
FIG. 16 is a side view showing a construction of a thermometer of a control.
Figure 17:
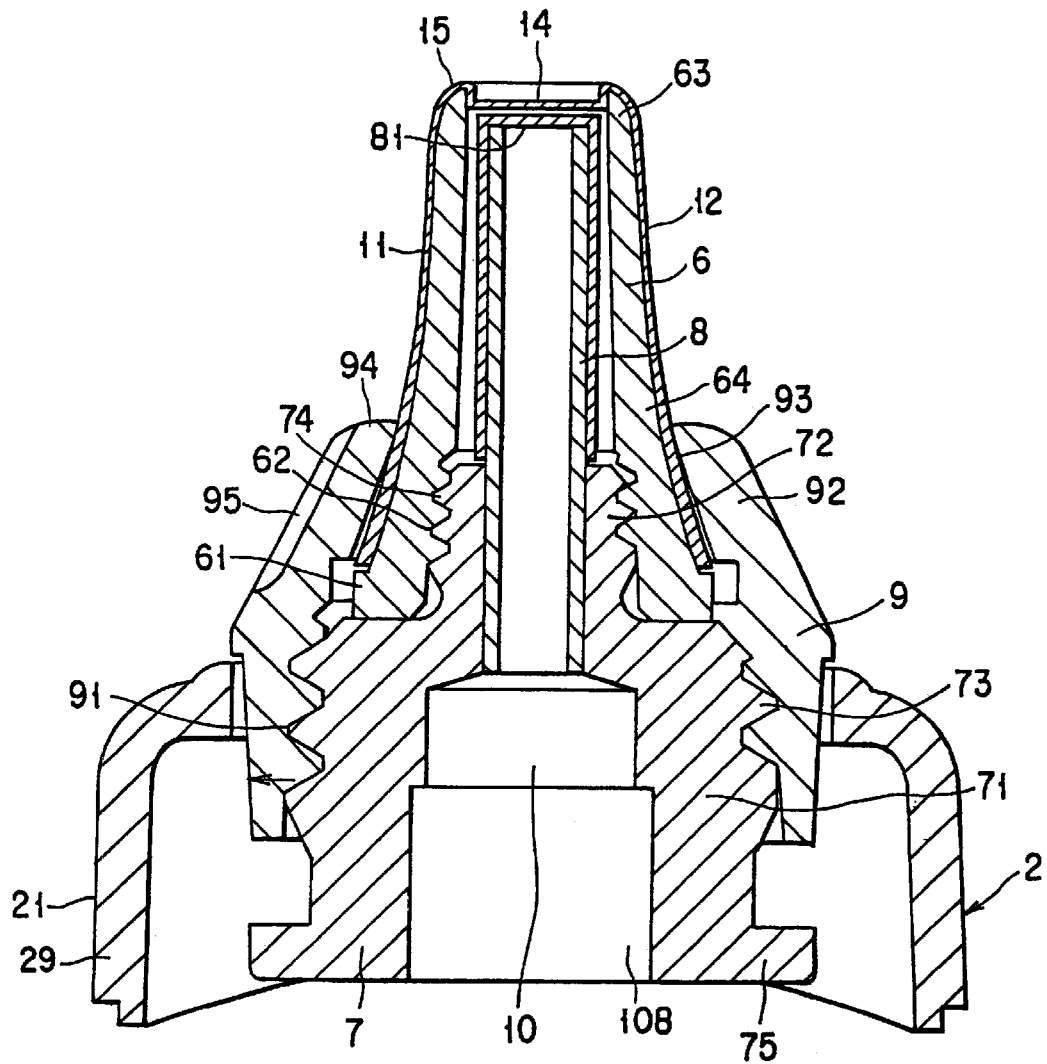
FIG. 17 is a longitudinal section showing the construction of the thermometer of the control.

None of the soundproof mechanisms ① to ④ was incorporated. The buzzer 33 was mounted on the circuit board 30 (at the position shown in FIG. 16). The transparent sheet 51 was given a thickness of 0.2 mm. Moreover, the periphery of the ring nut was given a structure shown in FIG. 17.

Figure 15:
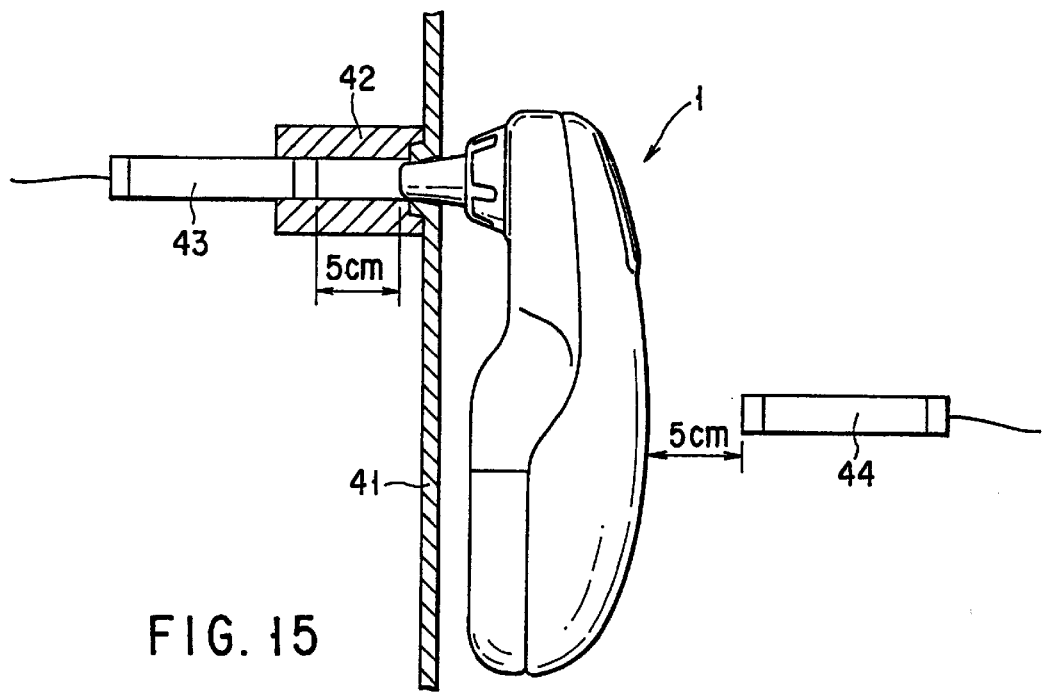
FIG. 15 is a partially sectional view showing a construction of an experimental device for measuring a sound-level.

As to the aforementioned individual ear type thermometers, the soundproof function was measured in an anechoic chamber by an experimental device shown in FIG. 15, as follows.

On one face side of a sound insulating member 41 made of rubber, there was mounted a cylindrical member which was made of polyurethane while assuming the ear of a subject, and the distal end portion of the probe 6 was inserted into the cylindrical member 42. At the other end of the cylindrical member 42, there was mounted a microphone 43. The distance between the microphone 43 and the distal end of the probe 6 was 5 cm. On the back face side of the ear type thermometer, too, there was mounted a similar microphone 44. The distance between the microphone 44 and the back face of the ear type thermometer was set to 5 cm.

In this state, the buzzer, as built in the ear type thermometer, was driven so that its sound was grasped to measure its sound-level by the microphones 43 and 44. The sound-level on the side of the microphone 43 corresponds to that on the side of the subject, and the sound-level on the side of the microphone 44 corresponds to that on the side of the operator. The results obtained are tabulated in the following Table 1.

TABLE 1

|  | Sound Level at Subject [dB] | Sound Level at Operator [dB] |
| --- | --- | --- |
| Example 1 | 75.5 | 77.0 |
| Example 2 | 74.0 | 76.0 |
| Example 3 | 76.5 | 78.0 |
| Example 4a | 75.5 | 79.0 |
| Example 4b | 69.0 | 79.3 |
| Example 4c | 64.2 | 79.6 |
| Example 5 | 75.0 | 77.0 |
| Example 6 | 73.0 | 78.0 |
| Example 7 | 71.0 | 79.0 |
| Control | 79.5 | 74.0 |

As enumerated in Table 1, any of the ear type thermometers of Examples 1 to 7 lowered the sound-level on the side of the subject by 3 dB or more but not the sound-level on the side of the operator, as compared with the ear type thermometer of Control having no soundproof mechanism. As a result, the sound-level of Examples 1 to 7 were reversed in their magnitudes between the sides of the subject and the operator, as different from Control, and the difference between the sound-level of the sides of the subject and the operator was 1.5 dB or more. Especially Examples 5, 6 and 7, in which a plurality of soundproof mechanisms were combined, could achieve more excellent soundproof functions.

Here, the combination of the soundproof mechanisms should not be limited to those of Examples 5 to 7 but may be any of ① to ④ or an arbitrary kind of combinations containing them.

Although the thermometer of the invention has been described in connection with its embodiments with reference to the accompanying drawings, the invention should not be limited thereto. Especially the construction of the soundproof mechanisms should not be limited to those of the shown embodiments.

The display 5 is constructed of a liquid crystal display device capable of indicating the measured body temperature in numerals and a symbol mark 59 composed of a plurality of segments. One example of this symbol mark 59 is illustrated in FIGS. 18A–18C.

Figure 18A:
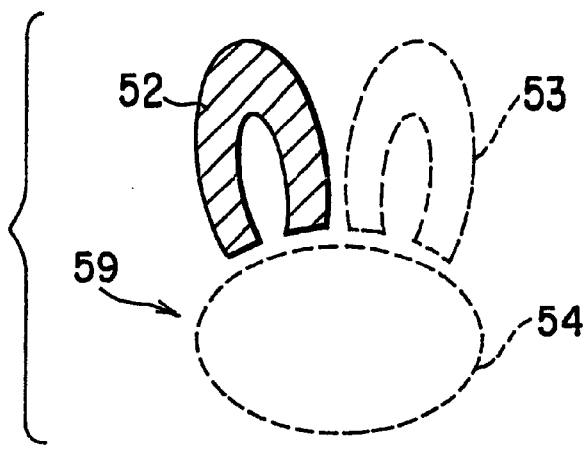
FIGS. 18A–18C are views showing one example of a symbol mark to be indicated in the display.
Figure 18B:
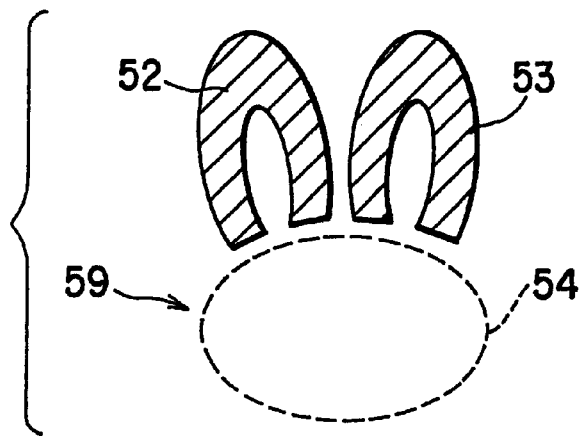
Figure 18C:
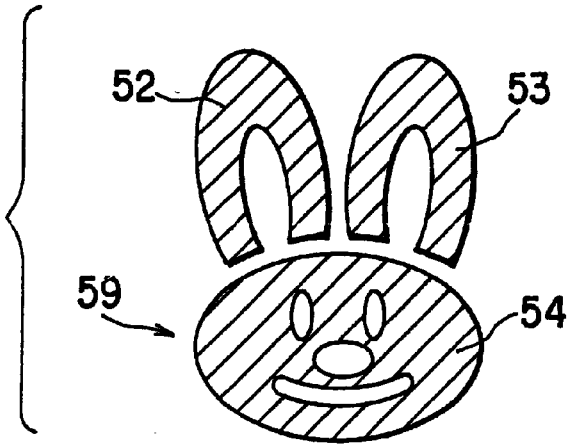

As illustrated in FIGS. 18A–18C, the symbol mark 59 indicates the character of a rabbit face and is composed of a first segment 52 indicating the left ear portion of the rabbit, a second segment 53 indicating the right ear portion of the rabbit, and a third segment 54 indicating the face portion of the rabbit. These segments 52 to 54 can be lighted or flashed independently of one another by the control of the control means 31.

During the standby period to be described later, for example, the first segment 52 is lighted or flashed at first for a predetermined time period (as shown in FIG. 18A). Then, the first segment 52 and the second segment 53 are lighted or flashed for a predetermined time period (as shown in FIG. 18B). Then, all the segments 52 to 54 are lighted or flashed (as shown in FIG. 18C). After this standby, all the segments 52 to 54 are lighted.

In this indication mode, the number of segments to be lighted or flashed increases with the lapse of time, and all the segments are lighted or flashed at last. Thus, it is possible to know the lapse of time easily and to judge the remaining time period. During the standby, therefore, it is possible to eliminate or lighten the feeling of uneasiness or the pain of standby.

In the indication mode, the symbol mark is gradually completed from an incomplete shape so that the completed character finally appears. An infant or child can be interested but not tired, when the body temperature is to be metered, by letting it observing the display while waiting. This can smooth the thermometry.

The thermometer 1 of the invention is equipped with correction means for correcting the metered value in accordance with the change in the environmental temperature. This correction means is installed as a program (software) in the control means (microcomputer) 31. Here will be described the meaning of the correction by this correction means and the construction of the correction means.

In the thermometric portion 10, the cold junctons 104 and the temperature sensor 107 may have different responsibilities to the fluctuations in the temperature of the environment in which the thermometer 1 is placed. In the transient situations where the temperature of the environment of the thermometer 1 fluctuates to change the environmental temperature of the infrared sensor 101 itself, a discrepancy may occur between the metered temperature of the temperature sensor 107 (the environmental temperature of the infrared sensor 101) and the temperature of the cold junctions 104 thereby to cause an error in the metered body temperature.

Figure 19:
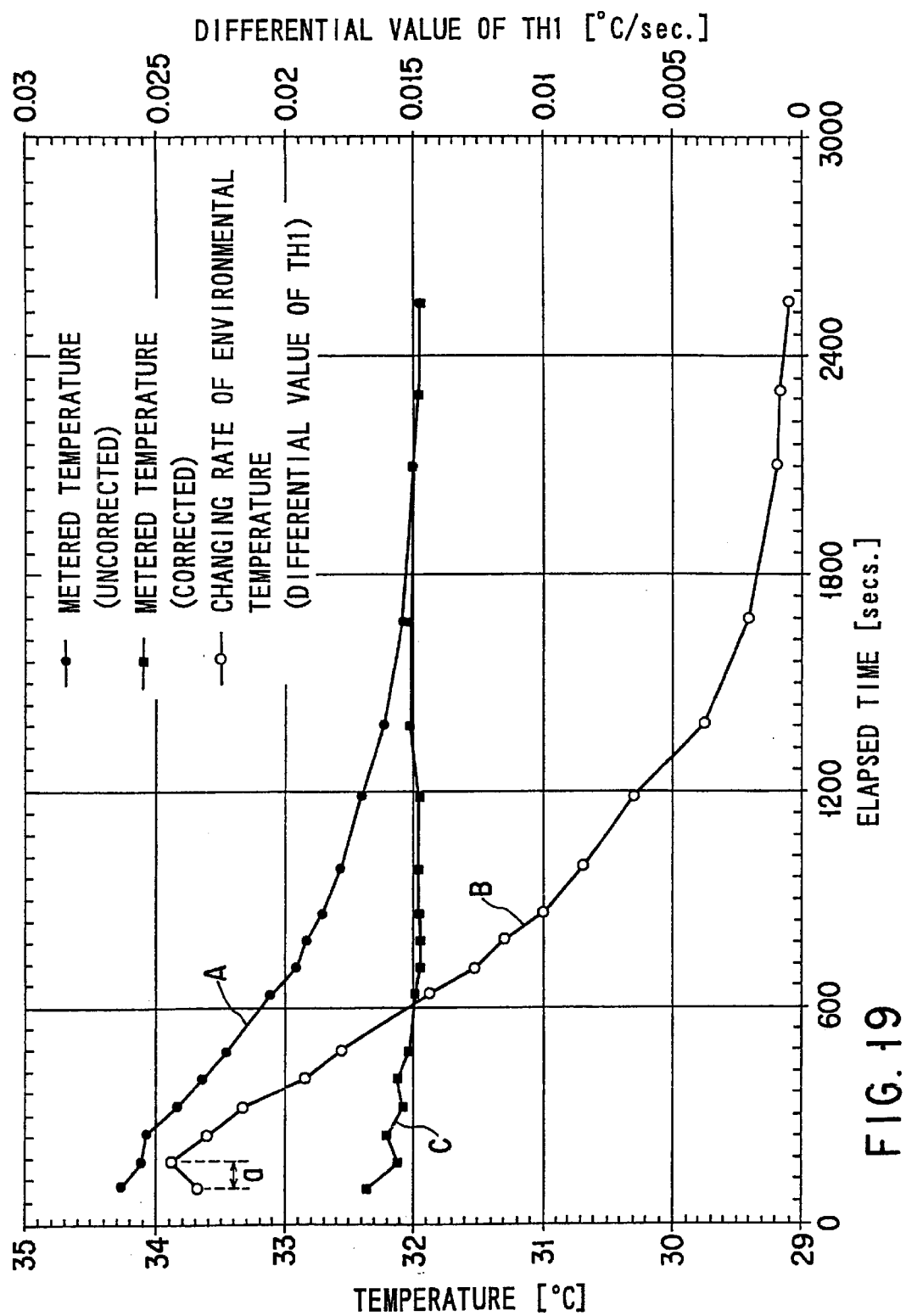
FIG. 19 is a graph plotting relations between changes in the environmental temperature with time and the metered temperatures.

FIG. 19 is a graph illustrating relations among the change in the environmental temperature of the thermometer 1, the metered temperature of the thermometer 1, and the changing rate of the environmental temperature of the infrared sensor 101. (A) in the graph indicates a relation between the elapsed time after movement to an environment at 25° C. and the metered temperature when the thermometer having no correction means is cooled to 5° C. and moved to an environment at 25° C. to meter a heat source (black body furnace) at 32° C. In this example, a temperature error has a value of +2° C. or more after 120 secs. from the movement to the environment at 25° C. and +1° C. or more even after 600 secs.

Both the temperature of the cold junctions 104 and the metered temperature of the temperature sensor 107 are subject to the influences of the temperature of the environment where the thermometer 1 is placed. In the aforementioned situations, the change in the metered temperature of the temperature sensor 107 per unit time, that is, the changing rate of the environmental temperature of the infrared sensor 101 is plotted as (B) in FIG. 19.

Figure 20:
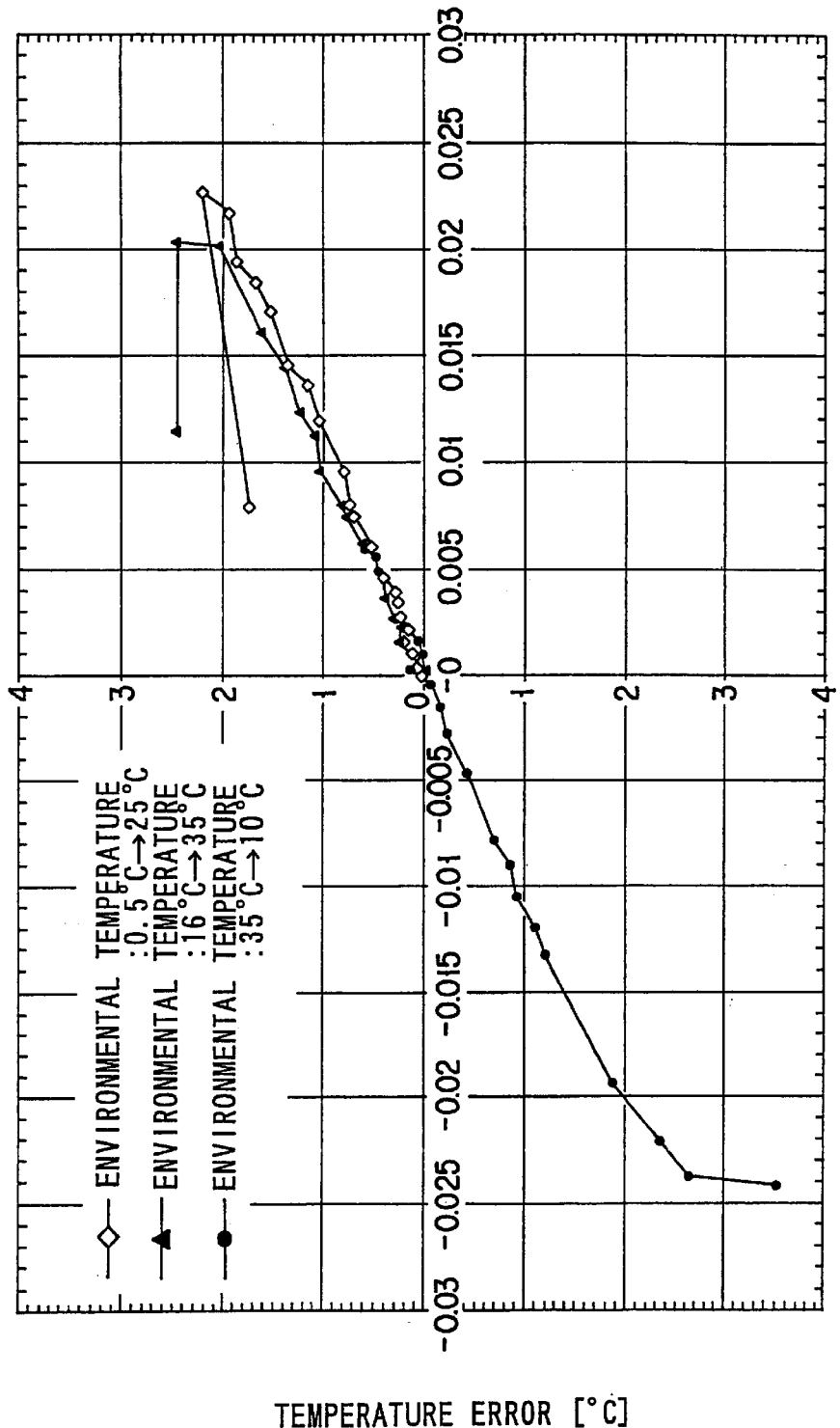
FIG. 20 is a graph plotting relations between the temperature changing ratios in the temperature sensor and the errors of the metered temperatures.

From (A) and (B) of FIG. 19, it is found out that a correlation is between the changing rate (differential value of TH1) of the metered temperature of the temperature sensor 107 and the temperature error of the metered temperature. The relation between the changing rate (differential value of TH1) of the metered temperature of the temperature sensor 107 and the temperature error of the metered temperature has been examined by changing the pattern of the environmental temperature change of the thermometer variously to confirm that there is a very good correlation, as illustrated in FIG. 20.

On the basis of this correlation, therefore, a calibration curve for a correction U to cancel the temperature errors against the individual changing rates of the metered temperatures of the temperature sensor 107 is prepared in advance to correct the metered temperature (body temperature) on the basis of the correction U. The temperature thus corrected is suppressed in its error within +0.4° C., as illustrated by (C) in FIG. 19, even immediately after the temperature fluctuation of the environment where the thermometer 1 is placed.

Figure 21:
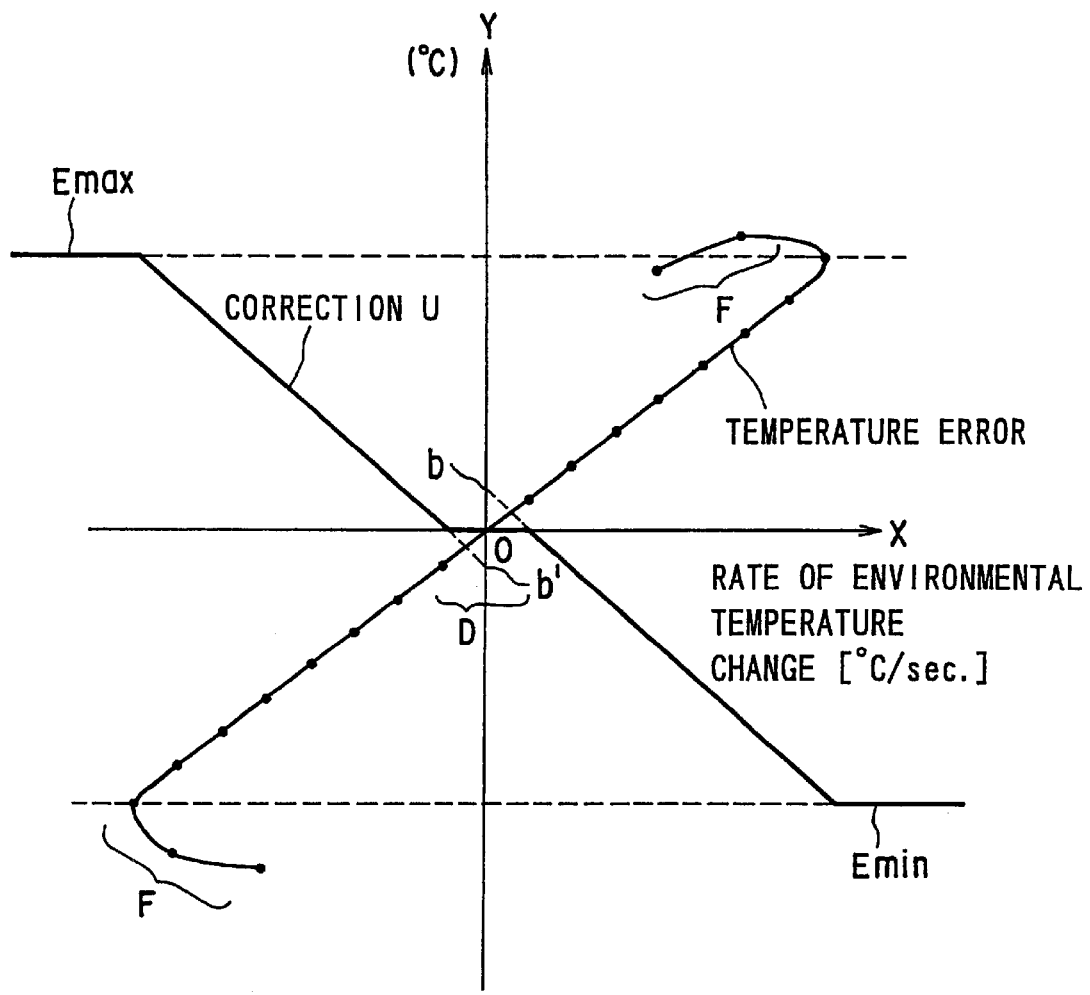
FIG. 21 a diagram illustrating relations between the temperature error and the correction.
Figure 22:
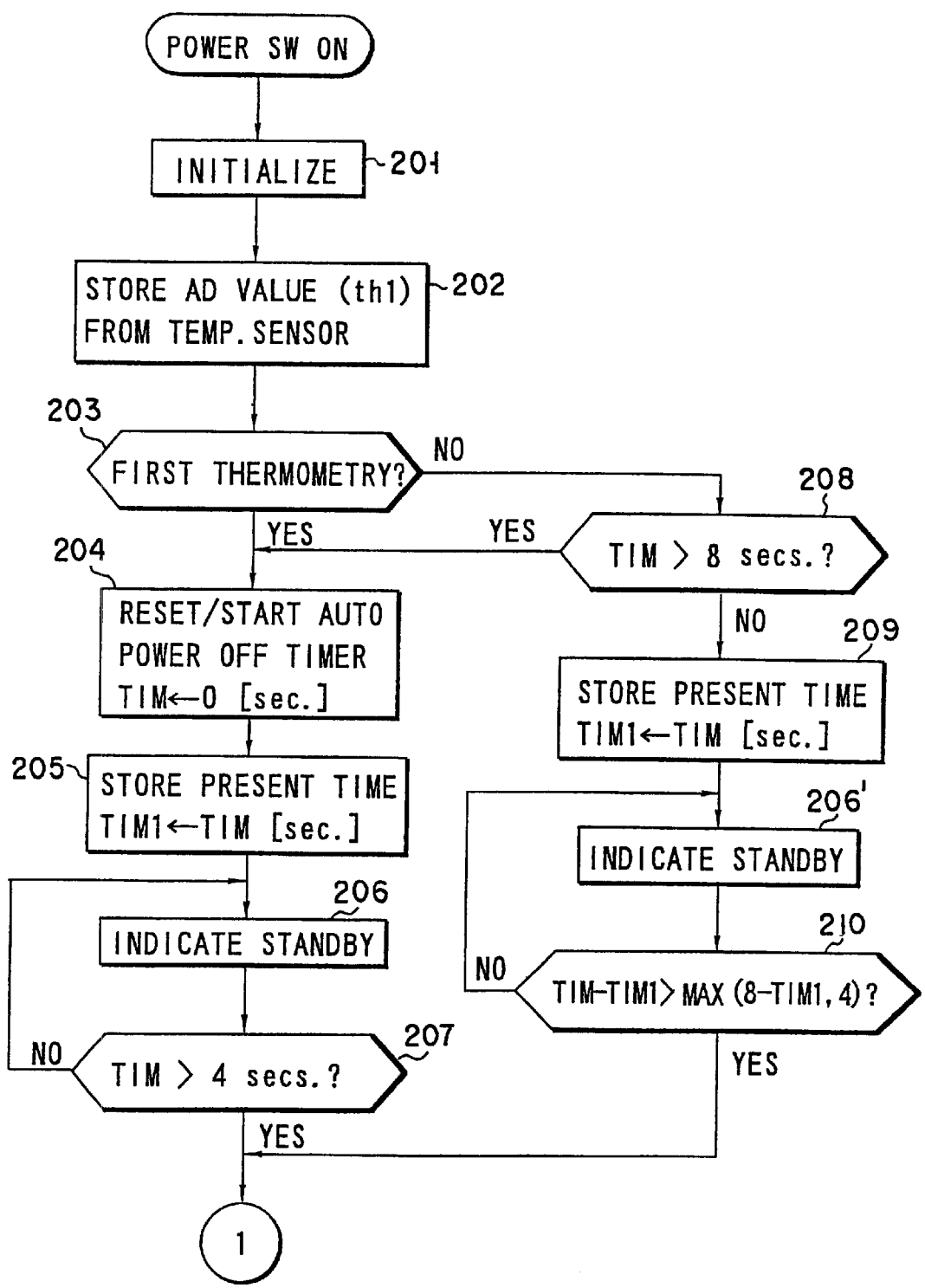
FIG. 22 is a flow chart showing a control procedure of control means.
Figure 23:
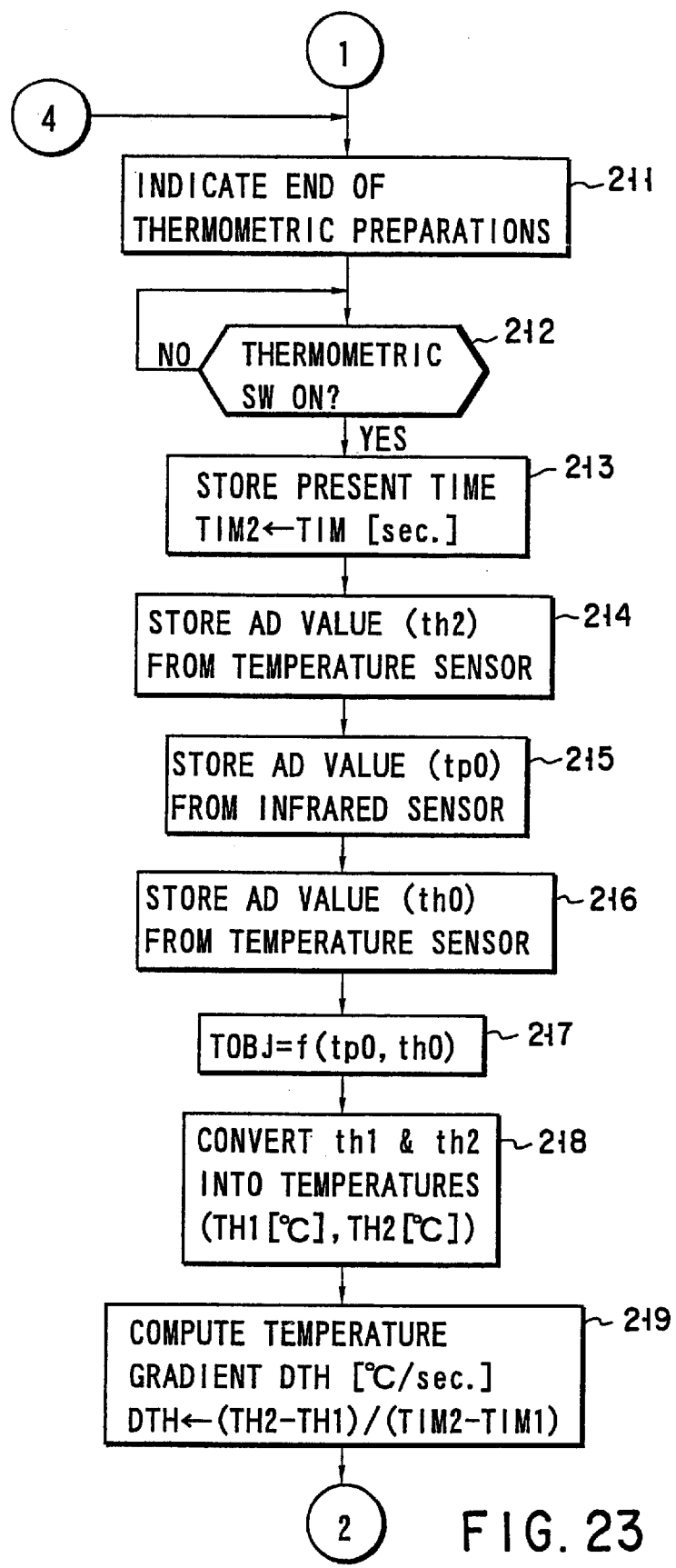
FIG. 23 is a flow chart showing the control procedure of the control means.
Figure 24:
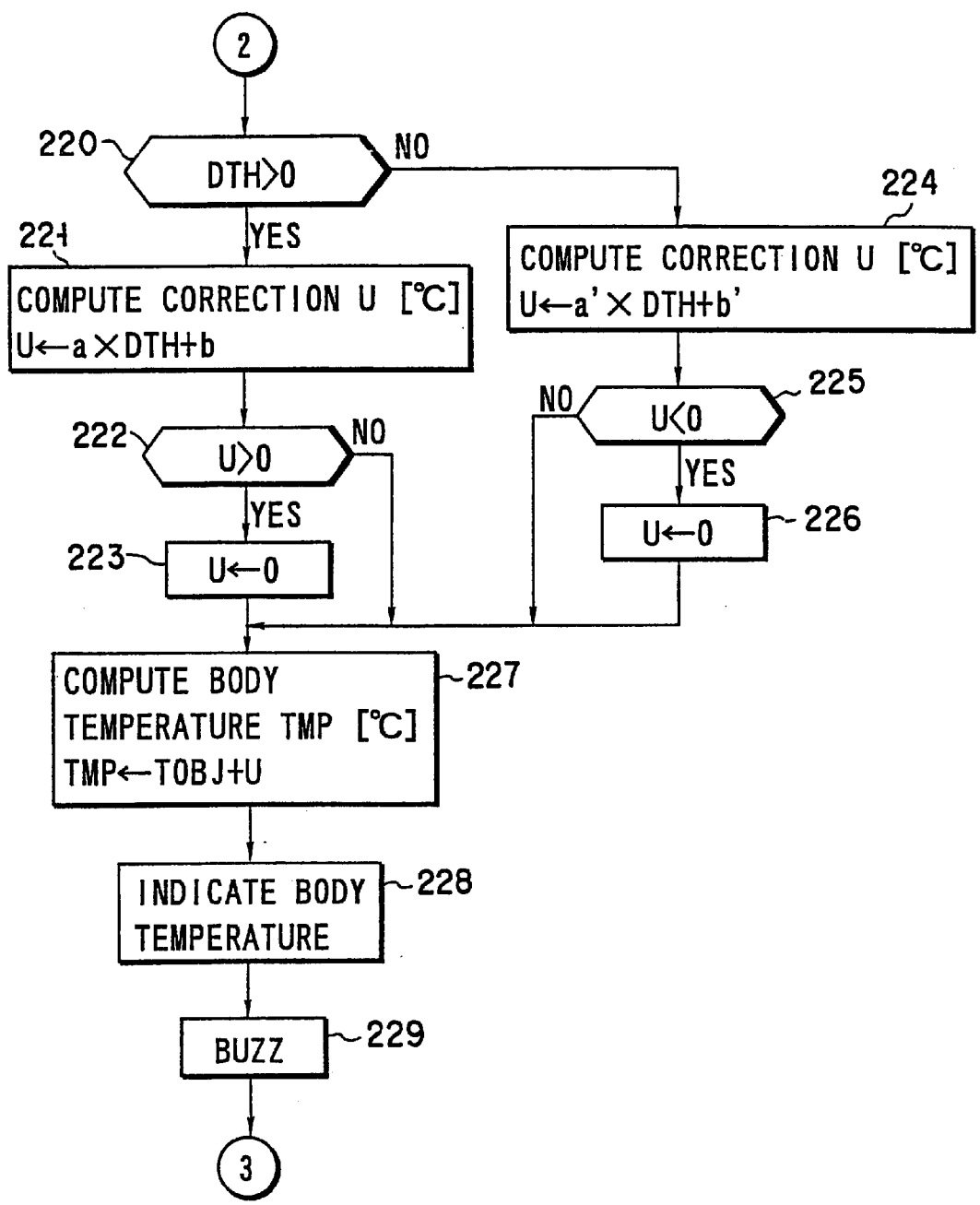
FIG. 24 is a flow chart showing the control procedure of the control means.
Figure 25:
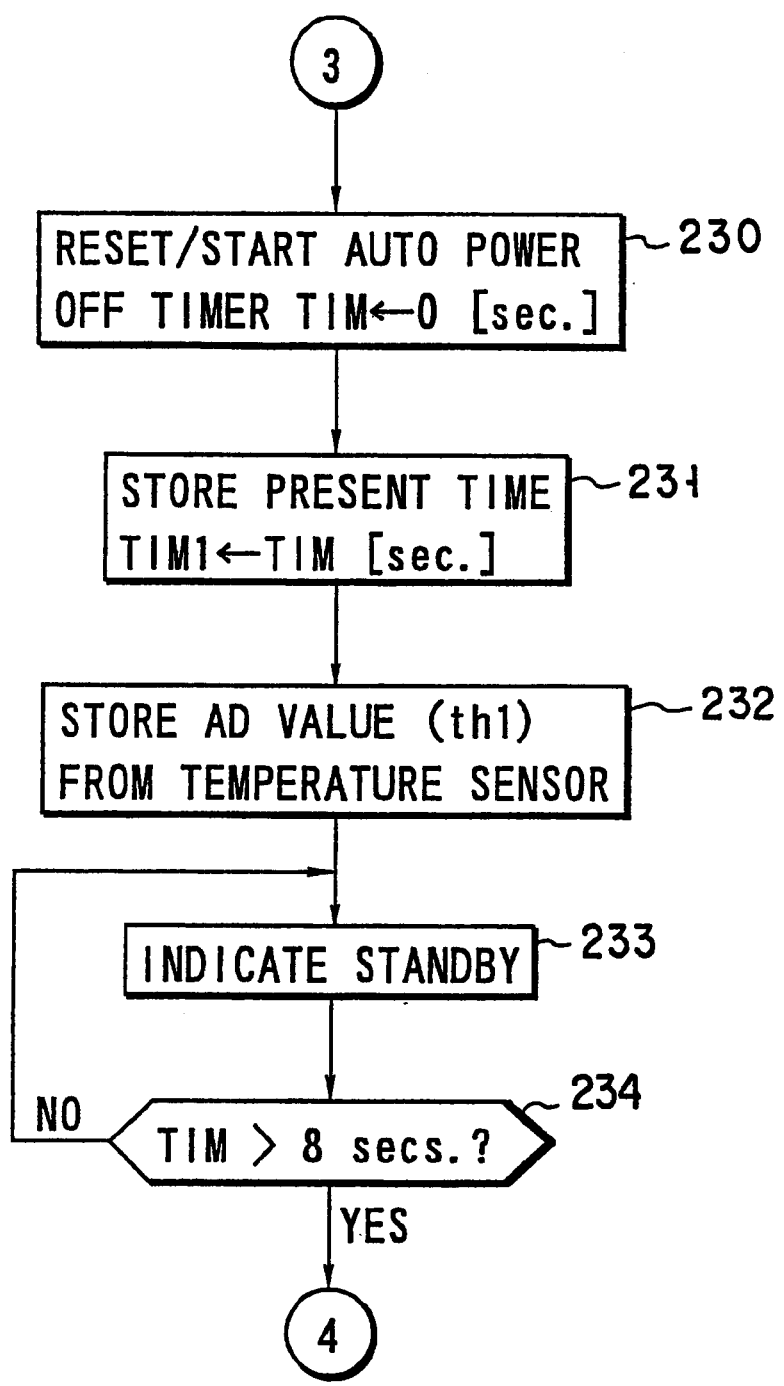
FIG. 25 is a flow chart showing the control procedure of the control means.

Here, FIG. 21 illustrates one example of the correction U. In FIG. 21, the X-axis indicates the changing rate of the environmental temperature, and the Y-axis indicates the temperature error uncorrected and the correction. The correction U is set to cancel the temperature errors excepting the temperature error of a region F where the changing rate of the environmental temperature is relatively high. In this case, in a region D where the changing rate of the environmental temperature is small (especially near 0), the noise component of the temperature change is considered to reduce the correction substantially to 0 so as to avoid an instability in the corrected temperature.

In the case of a slow temperature change (in case the temperature is metered extremely many times, for example), more specifically, the metered temperature at the temperature sensor 107 arises, and the fluctuation component (noise component) of the metered temperature is amplified to appear in the differential value. If this fluctuation is corrected, the value naturally becomes unstable. In this case, therefore, no substantial correction is made to set the correction U substantially to 0.

On the other hand, the correction U is restricted, if necessary, by an upper limit and/or a lower limit. In order to prevent an extremely large correction from being erroneously made by the influences of noises, for example, it is possible to set the upper limit Emax and the lower limit Emin. Here, the noises are caused when the AD value is erroneously made abnormal by the malfunction of the A/D converter 32. As illustrated in FIG. 21, therefore, the correction U takes the values Emax and Emin in the regions wherein the temperature changing rate has a large absolute value and where the corrected values considering the correlation between the temperature changing rate and the metered temperature error are at Emax or more and at Emin or less.

In order to make the corrections on the basis of the temperature change of the environment of the thermometer 1, as described above, it is necessary to detect the changing rate of the environmental temperature of the infrared sensor 101. For this necessity, the environmental temperature of the infrared sensor 101 has to be metered two times at a predetermined time interval (of 4 secs. in this embodiment), and the thermometry has to stand by for that time interval.

For this standby time, the symbol mark 59 is indicated in the aforementioned mode in the display 5 in this embodiment.

After the thermometry of the body temperature, moreover, the probe 6 of the thermometer 1 is partially warmed by the heat transfer from the inside of the ear so that a temperature distribution arises among the probe cover 11, the probe 6, the temperature sensor 107 and the cold junctions 104. This temperature distribution causes the temperature error. After the finish of thermometry, therefore, the subsequent thermometry of the body temperature has to be inhibited to stand by for a predetermined period till the temperature distribution is settled to some extent, that is, till the probe 6 is cooled down.

In this embodiment, the symbol mark 59 is indicated in the aforementioned mode in the display for the standby time (e.g., 8 to 10 secs. in this embodiment) after the finish of a thermometry and before a next thermometry is possible.

FIGS. 22 to 25 are flow charts showing the controlling operations of the control means 31. One example of the control operations of the control means 31 will be described along with the flow charts.

When the power switch 3 is turned ON, an initialization is performed (at Step 201) at first for the operations of the control means 31 such as I/O or the like. Then, an AD value (th1) from the temperature sensor 107 is stored in a memory (at Step 202) so as to examine the temperature change in the environmental temperature of the infrared sensor 101 (as will be shortly called the "temperature change").

Next, it is decided (at Step 203) whether or not the thermometry is first (with the auto power OFF timer being inactive). In the first thermometry, the auto power OFF timer is reset/started (at Step 204). At this time, TIM is set to 0.

The present time (the timer value TIM) is stored in TIM1 (at Step 205), and the indication of standby is started in the display 5 (at Step 206). This standby indication is effected by the symbol mark 59 in the aforementioned mode.

It is decided (at Step 207) whether or not the time period of the timer has elapsed 4 secs. The standby is indicated till 4 secs. is elapsed. After lapse of 4 secs., the routine transfers to a later-described Step 211. Here, this time period "4 secs." is the necessary minimum standby time to determine the temperature change, and its setting can be arbitrarily changed.

If it is decided at Step 203 that the thermometry is not first, it is decided (at Step 208) whether or not the time period of the timer has elapsed 8 secs., that is, whether or not 8 secs. has elapsed from the finish of the previous thermometry. If this answer is YES, the thermometry is possible so that the routine transfers to Step 204. Here, this time period "8 secs." is a sufficient time period for the probe 6 to be cooled after the thermometry till the temperature distribution is homogenized to some extent, and its setting can be arbitrarily changed.

If the decision of Step 208 reveals that 8secs. has not elapsed yet, the present time (the value TIM of the timer) is stored in TIM1 (at Step 209), and the standby is indicated in the display 5 (at Step 206').

Next, a comparison is made between TIM−TIM1 and the larger value of 8−TIM1, 4 to decide whether or not the former is larger (at Step 210). The routine advances to Step 211, if the former is larger, but otherwise returns to Step 206' to repeat the decisions of Step 210. As a result, a predetermined standby time can be retained to cool the probe 6 sufficiently for the thermometry.

When this standby time elapses, the end of thermometric preparations is indicated (at Step 211), and the input of the thermometric switch 4 is awaited (at Step 212). When the thermometric switch 4 is pressed (turned ON), the present time (the value TIM of the timer) is stored in the TIM2 (at Step 213), and the AD value (th2) from the temperature sensor 107 is stored in the memory (at Step 214).

In order to meter the temperature of the subject portion (heat source), the AD value (tp0) from the infrared sensor 101 is stored in the memory (at Step 215), and the AD value (th0) from the temperature sensor 107 is stored in the memory (at Step 216).

In the operation unit, the values tp0 and th0 are substituted into a preset formula TOBJ=f(tp0, th0) between a heat source temperature (before corrected) TOBJ (metered value) and the values tp0 and th0, thereby to calculate the heat source temperature (before corrected) (at Step 217).

In order to determine the temperature gradient (the temperature changing rate) DTH, moreover, the values th1 and th2 are converted into temperatures to determine TH1 [°C] and TH2 [°C] (at Step 218), and the temperature gradient DTH is computed (at Step 219) from the values TH1, TH2, TIM1 and TIM2.

Next, the correction U [°C] is determined by correction means (at Steps 220 to 226). At first, it is decided (at Step 220) whether or not the temperature gradient DTH is larger than 0. If this answer is YES, that is, if the temperature gradient is located at the righthand side of the Y-axis in FIG. 21, the correction U [°C] is set (at Step 221) to a×DTH+b (wherein letters a and b are coefficients which are experimentally determined in advance). Moreover, it is decided (at Step 222) whether or not the correction U is larger than 0. If this answer is YES, that is, if the temperature gradient is confined in the region D in FIG. 21, the correction U is changed to 0 (at Step 223). In other cases, the correction U is kept as it is. If Step 220 decides that the temperature gradient DTH is not larger than 0 but located at the lefthand side of the Y-axis in FIG. 21, the correction U [°C] is set (at Step 224) to a'×DTH+b' (wherein letters a', and b', are coefficients which are experimentally determined in advance). Moreover, it is decided (at Step 225) whether or not the correction U is smaller than 0. If this answer is YES, that is, if the temperature grodients is confined in the region D of FIG. 21, the correction U is set to 0 (at Step 226). In other cases, the correction U is kept as it is.

Next, the body temperature TMP [°C] is computed with the aforementioned correction (at Step 227). Specifically, the body temperature TMP [°C] (the temperature value at the portion to be metered) is determined in the form of TOBJ+U [°C].

Next, the body temperature, as determined at Step 227, is indicated in the display 5 (at Step 228). The buzzer 33 is activated (at Step 229) to inform the finish of thermometry. In response to this information of the buzzer 33, the operator pulls out the probe 6 from the earhole. This takes a time period of about 2 secs.

Next, the auto power OFF timer is reset/started (at Step 230), and the present time (the value TIM of the timer) is stored in the TIM1 (at Step 231). For the subsequent thermometry, the AD value (th1) from the temperature sensor 107 is stored in the memory (at Step 232).

Next, the indication of standby in the display 5 is started (at Step 233). This standby indication is effected by the symbol mark 59 in the aforementioned mode. In this indication mode, for example, the first segment 52 of the symbol mark 59 is flashed for 3 secs. (as shown at (a) in FIG. 18), the first segment 52 and the second segment 53 are then flashed for 3 secs. (as shown at (b) in FIG. 18), and all the segments 52 to 54 are flashed for 2 secs. (as shown at (b) in FIG. 18), and all the segments 52 to 54 are lighted.

It is decided (at Step 234) whether or not the time period of the timer has elapsed 8 secs. If this answer is YES, the standby is indicated. After lapse of 8 secs., the routine returns to Step 211. Here, this time period of "8 secs." is for cooling the probe 6, as heated by the body temperature, as close as possible to the environmental temperature of the thermometer 1. The setting of the time period can be arbitrarily changed. For this standby of 8 secs., moreover, an interruption of the thermometric switch 4 is inhibited.

Even if the power switch 3 is turned OFF for the standby of 8secs., the auto power OFF timer, as started at Steps 204 and 230, continues its counting action till the time period of 60 secs. elapses. If the power switch 3 is turned ON again before the lapse of the time period of 8 secs. of the auto power OFF timer, the standby is continued till the time period of 8 secs. elapses at Step 210.

Figure 26:
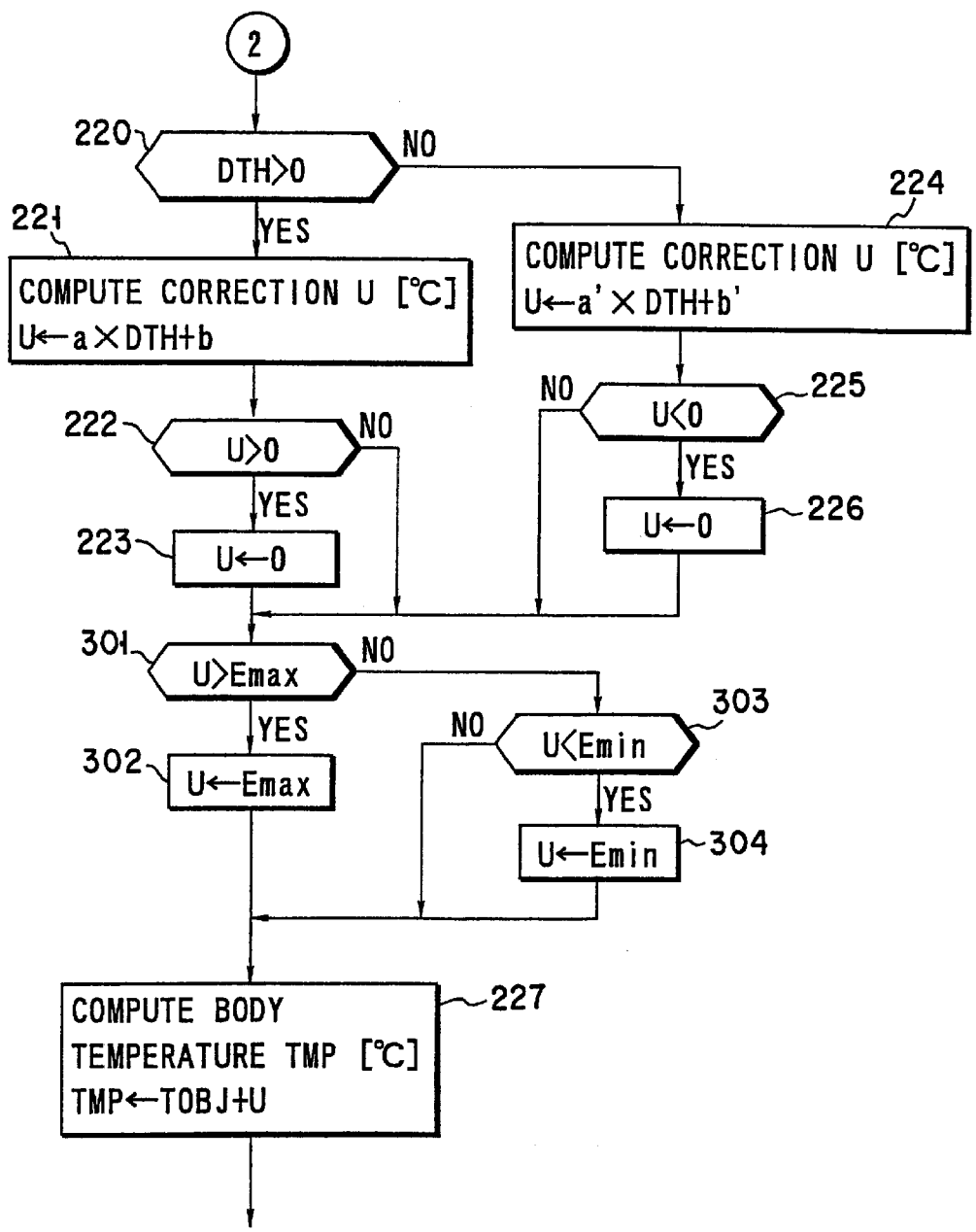
FIG. 26 is a flow chart showing a control procedure of control means in another embodiment of the invention.

Here will be described another example in which the control operations of the control means 31 are partially different. FIG. 26 is a flow chart showing a portion of the control operations of the control means 31. With reference to this flow chart, here will be described the points which are different from those of the example shown in FIGS. 22 to 25.

This example is similar to that shown in FIGS. 22 to 25 excepting that the operations of Steps 301 to 304 shown in FIG. 26 are inserted before the operation of Step 227 of the example shown in FIGS. 22 to 25.

After similar Steps 222, 223, 225 or 226, as shown in FIG. 26, it is decided (at Step 301) whether or not the correction U is higher than the preset upper limit Emax. If this answer is YES, the correction U is changed to the value Emax (at Step 302).

If the decision of Step 301 reveals that the correction U is no more than Emax, it is further decided (at Step 303) whether or not the correction U is smaller than the preset lower limit Emin. If this answer is YES, the correction U is change to Emin (at Step 304). If the correction U is no less than Emax, it is kept as it is.

Next, the body temperature TMP [°C] with the aforementioned correction is computed (at Step 227). In short, the body temperature TMP is determined as TOBJ+U [°C]. From now on, the operations of Steps 228 to 234 are executed like before.

Although the thermometer of the invention has been described in connection with the individual embodiments with reference to the accompanying drawings, the invention should not be limited thereto. For example, the position of the display for indicating the symbol mark may be located on the upper, back or side face of the thermometer body. Moreover, the shape, size and the number of the symbol mark to be displayed, and the arrangement and number of segments, and the lighting or flashing patterns may also be any other than those of the shown embodiments.

According to the thermometer of the invention, as has been described hereinbefore, the provision of the fixing member makes it possible to mount the probe cover stably on the probe. Especially, since the probe cover will not easily come out from the probe, it is possible to reliably prevent the disadvantage that only the probe cover is left in the earhole when the probe is pulled out from the earhole after the thermometry. When the fixing member is made of the ring nut or the like, moreover, it is further possible to prevent the disadvantage that the infant may remove the probe cover erroneously to take it into the mouth.

When the different fixing members are replaced for use, moreover, the depth and so on of insertion of the probe into the earhole can be set to the proper conditions in accordance with the ages or individual differences.

When the fixing member has the function to regulate the depth of insertion of the probe into the subject portion, moreover, it is possible to prevent the metering error, as caused by the fluctuation in the insertion depth into the earhole, and the disadvantage that the probe goes excessively deep into the earhole to hurt the deep portion of the ear.

Thus, the thermometry can be performed under more proper conditions with neither the come-out nor the positional displacement of the probe cover so that the thermometric accuracy can be improved to enhance the safety.

According to the thermometer of the invention, moreover, the thermometer is neither deflected for the thermometry even if the thermometric switch is operated, nor is changed the direction or depth of insertion of the probe into the earhole, so that a highly reliable thermometry can be achieved without any dispersion of the metered value.

Since the position or direction of the thermometer can be fixed by the raised portion, moreover, the probe is neither moved during the thermometry, nor is fluctuated the direction or depth of insertion of the probe according to each operation of the thermometric switch so that a highly accurate metered value can be achieved. During the thermometry, moreover, the power switch is not erroneously operated.

According to the thermometer of the invention, moreover, it is possible to prevent or suppress the beep sound (information sound) such as the buzzer sound from reaching the earhole of the subject to discomfort the subject.

Moreover, the beep sound (information sound) such as the buzzer sound can be kept sufficient for the subject so that the information function is not deteriorated.

According to the thermometer of the invention, moreover, the operator or subject can be effectively informed of the standby state. Since the number of segments to be lighted or flashed changes with the lapse of time, the time lapse can be easily grasped to judge the remaining time period easily. During the standby time, therefore, it is possible to eliminate or lighten the uncomfortableness or the pain of standby.

When the body temperature of the infant or child is to be metered, moreover, it is enabled to be attracted and well-behaved by the display. In the quiet state, therefore, the thermometry can be made smoothly to prevent the drop, as might otherwise be caused by the insufficient stability in the insertion of the probe, in the thermometric accuracy.

According to the invention, moreover, the metering accuracy of the body temperature can be improved by making a correction according to the change in the environmental temperature.

The metering accuracy of the body temperature can be enhanced by the construction, in which the correction is determined according to the temperature gradient determined on the basis of the metered value of the temperature metering means, the construction, in which the correction is reduced substantially to 0 (with no substantial correction) when the change in the environmental temperature is small, or the construction in which the correction is given the upper limit and/or the lower limit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ear type thermometer for metering a body temperature, comprising: a thermometer body; a probe mounted in said thermometer body and adapted to be inserted into an ear, with a probe cover comprised of a preformed cylindrical body having an open proximal end and a closed distal end, a screwing member for fixing said probe cover mounted on said probe, and temperature measuring means for measuring the body temperature based on infrared rays from the ear passing through the probe cover.

2. An ear type thermometer according to claim 1,
   wherein said screwing member is given a function to regulate the depth of insertion of said probe into the ear.

3. An ear type thermometer according to claim 2,
   wherein said screwing member has a flat end face to come into abutment against the periphery of a subject portion for regulating the depth of insertion of said probe into the ear.

4. An ear type thermometer according to claim 1,
   wherein said probe is removably mounted on said thermometer body.

5. An ear type thermometer according to claim 4,
   wherein said screwing member is given a function to fix said probe with respect to said thermometer body.

6. An ear type thermometer according to claim 1,
   wherein said screwing member is a ring nut to be fastened on said thermometer body.

7. An ear type thermometer according to claim 1,
   wherein said screwing member includes slip stopping means for preventing slippage of a user's fingers during fixing and releasing actions of the screwing member.

8. An ear type thermometer for metering a body temperature, comprising: a thermometer body; a probe mounted in said thermometer body and adapted to be inserted into an ear, with a probe cover comprised of a preformed cylindrical body having an open proximal end and a closed distal end, at least one screwing member having a function to fix said probe cover mounted on said probe, the at least one screwing member being replaceable with at least one other screwing member having a different shape and size, and temperature measuring means for measuring the body temperature based on infrared rays from the ear passing through the probe cover.

9. An ear type thermometer for metering a body temperature, comprising: a thermometer body; a probe mounted in said thermometer body and adapted to be inserted into an ear, with a probe cover comprised of a preformed cylindrical body having an open proximal end and a closed distal end, at least one screwing member having a function to fix said probe cover mounted on said probe, the at least one screwing member being replaceable with at least one other screwing member to provide a different length of protrusion of said probe, and temperature measuring means for measuring the body temperature based on infrared rays from the ear passing through the probe cover.

10. An ear type thermometer for metering a body temperature, comprising:
   a thermometer body;
   a probe mounted on said thermometer body and adapted to be inserted into an ear;
   a probe cover adapted to be positioned over an end of the probe, the probe cover comprised of a preformed cylindrical body having an open proximal end for receiving the probe;
   a rotatable ring nut for fixing the probe cover on the probe; and
   temperature measuring means for measuring the body temperature based on infrared rays form the ear passing through the probe cover.

11. The ear type thermometer according to claim 10, wherein a support base supporting the probe includes external threads and the rotatable ring nut includes internal threads, the internal threads of the rotatable ring nut engaging the external threads of the support base to fix the probe cover on the probe.

12. The ear type thermometer according to claim 10, wherein the ring nut includes a generally flat distal end face that is adapted to abut against a portion of an entrance to the ear upon insertion of the probe to regulate insertion of the probe to a predetermined depth.

13. The ear type thermometer according to claim 10, wherein an outer circumference of the ring nut is provided with slide stopping means for preventing slipping of a user's fingers during rotation of the ring nut.

14. The ear type thermometer according to claim 10, wherein the probe cover has a closed distal end, the probe cover having a ring-shaped lip portion at the closed distal end and a film that is positioned inwardly of the lip portion, the film being recessed relative to the lip portion.

* * * * *